US012716697B1

(12) United States Patent
Ogden, II et al.

(10) Patent No.: US 12,716,697 B1
(45) Date of Patent: Aug. 25, 2026

(54) SYSTEM AND METHOD FOR MARKSMANSHIP TRAINING

(71) Applicant: Triumph Systems, Inc., Earth City, MO (US)

(72) Inventors: Jared Wallace Ogden, II, Quincy, IL (US); Justin Taylor Snell, St. Louis, MO (US); Jeffrey Austin Colt King, Lake St. Louis, MO (US)

(73) Assignee: Triumph Systems, Inc., Earth City, MO (US)

( * ) Notice: Subject to any disclaimer, the term of this patent is extended or adjusted under 35 U.S.C. 154(b) by 0 days.

(21) Appl. No.: 18/232,118

(22) Filed: Aug. 9, 2023

Related U.S. Application Data

(60) Provisional application No. 63/396,694, filed on Aug. 10, 2022.

(51) Int. Cl.

| | |
|---|---|
| ***F41J 5/14*** | (2006.01) |
| ***F41J 5/02*** | (2006.01) |
| ***F41J 5/06*** | (2006.01) |
| ***F41J 7/00*** | (2006.01) |
| ***G09B 5/06*** | (2006.01) |

(52) U.S. Cl.
CPC . *F41J 5/14* (2013.01); *F41J 5/02* (2013.01); *F41J 5/06* (2013.01); *F41J 7/00* (2013.01); *G09B 5/065* (2013.01)

(58) Field of Classification Search
CPC . F41J 5/14; F41J 5/02; F41J 5/06; F41J 7/00; G09B 5/065
See application file for complete search history.

(56) References Cited

U.S. PATENT DOCUMENTS

| | | | |
|---|---|---|---|
| 4,695,256 | A | 9/1987 | Eichweber |
| 5,281,142 | A | 1/1994 | Zaenglein, Jr. |
| 6,322,365 | B1 | 11/2001 | Shechter et al. |
| 6,433,774 | B1 | 8/2002 | D'Hooge |
| 8,472,665 | B2 | 6/2013 | Hildreth |
| 9,253,383 | B2 | 2/2016 | Hunt |
| 9,360,283 | B1 | 6/2016 | Tejada et al. |
| 9,891,028 | B2 | 2/2018 | Ghani |

(Continued)

FOREIGN PATENT DOCUMENTS

| | | |
|---|---|---|
| CN | 113776390 | 12/2021 |
| WO | 2022051690 | 3/2022 |

*Primary Examiner* — Robert P Bullington
(74) *Attorney, Agent, or Firm* — Carmody MacDonald P.C.; Dennis JM Donahue, III; Kevin C. Staed

(57) ABSTRACT

The present invention is a mobile app using a mobile computing device's camera and microphone to monitor and score metrics for a shooting drill assigned to a marksman on the display of the mobile computing device. Mobile computing devices for multiple users of the mobile app are in networked communication with a server. The individual data points for total time, split time(s), reaction time(s), accuracy, and precision as well as an overall combined score can be saved for each marksman and compared to other marksmen's shooting metrics. Scores can also be assessed based on decision making, such as shoot/threat vs. no shoot/nonthreat. The present invention also provides a virtual shooting range in which users engage in online community activities, competitions, forums, skill building, and training. The mobile app receives wireless signals from a dynamic target stand indicating a target is turned and automatically correlates target turns with the shot clock.

20 Claims, 12 Drawing Sheets

(56) References Cited

U.S. PATENT DOCUMENTS

| | | | |
|---|---|---|---|
| 10,077,969 | B1 | 9/2018 | Tamir |
| 10,295,315 | B2 | 5/2019 | Harris et al. |
| 10,648,781 | B1 | 5/2020 | Behiel |
| 10,663,259 | B2 | 5/2020 | Allgaier |
| 10,670,373 | B2 | 6/2020 | Tamir |
| 10,876,818 | B2 | 12/2020 | Tamir |
| 11,047,653 | B1 | 6/2021 | Sender et al. |
| 2003/0082502 | A1 | 5/2003 | Stender et al. |
| 2011/0217678 | A1 | 9/2011 | Shin |
| 2012/0083342 | A1 | 4/2012 | Cross et al. |
| 2020/0088500 | A1 | 3/2020 | Lebbing et al. |
| 2020/0263956 | A1 | 8/2020 | Allgaier |
| 2021/0180921 | A1 | 6/2021 | Schochmann |

LIVE FIRE FLOW

DRY FIRE FLOW

DYNAMIC TARGET
STAND FLOW

Decibel Levels for Caliber of Firearms

Rifle

| Caliber | dB |
|---|---|
| .223, 55GR. | 155.5 |
| 5.56 x 45mm (.223) | 158.9 |
| D | 147.1 |
| 7.62 x 51mm (.308) | 159 |
| .45 ACP | 151 |

Handgun

| Caliber | dB |
|---|---|
| 0.357 | 169 |
| .357 Ruger | 168.8 |
| 0.44 | 165.7 |
| .22 blank | 165.3 |
| 0.38 | 164.7 |
| .357 Magnum | 164.3 |
| .41 Magnum | 163.2 |
| 9mm | 163 |
| 9mm | 160 |
| 9mm | 159.8 |
| .45 ACP 159 | 159 |
| .38 | 157.7 |
| .45 ACP | 157 |
| .38 Spl | 156.3 |
| .44 Spl | 155.9 |
| .22 short | 155.1 |
| .45 COLT | 154.7 |
| .32 ACP | 153.5 |
| .38 S&W | 153.5 |
| .32 LONG | 152.4 |
| .22LR | 157.5 |

SYSTEM AND METHOD FOR MARKSMANSHIP TRAINING

CROSS-REFERENCE TO RELATED APPLICATIONS

This application claims priority from U.S. Provisional Patent Application No. 63/396,694 filed on Aug. 10, 2022 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to marksmanship training, competitions, and community building, and more particularly to computer integrated systems that use machine vision to automatically identify shot placement on targets and determine shot accuracy, precision, speed, time and other relevant metrics during shooting drills.

Related Art

Computerized systems with machine vision have been used to automatically identify shot placement on targets and determine shot accuracy, precision, speed, time and other relevant metrics during shooting drills and to then calculate a score for the drill. However, current marksmanship systems are mostly focused on individual skill building exercises based on the traditional shooting range and fail to provide marksmen with opportunities for communicating with each other and to engage in competitions apart from the infrastructure provided by traditional shooting ranges. Accordingly, marksmen have to use one system for the mechanics of training and another system for competitions and yet another system for communicating with each other. Traditionally, marksmen would train, compete, and communicate at the shooting range, and the computer systems have been developed based on the traditional shooting range. It would be beneficial to have an integrated software application that can automatically determine the results from a shooting drill and that also allows users to interact with each other virtually through the software application in a way that emulates their interactions at a shooting range.

With the increase in use of training, networking, and socializing using computer systems, it has become possible to create a web-based virtual shooting range where marksmen are not limited by their location to compete and interact with each other. Rather than using different computerized systems for traditional shooting ranges in a virtual shooting range, it would be beneficial to integrate entirely different functions and features into a single computerized system that has a shared dashboard to reduce the friction in the interface between the different systems. Additionally, it would also be beneficial to integrate the software application with the turning functions of dynamic target stands so the software application automatically starts the shot clock and produces split times based on the times that the targets are turned. When training with laser fire, it would also be beneficial to control the start of the training with a laser burst.

SUMMARY OF THE INVENTION

The present invention is a mobile app which uses the camera and microphone feature of a smartphone, tablet computer, or other mobile computing device to monitor and score shooting metrics corresponding with a drill assigned to the marksman on the display of the mobile computing device or a free shooting exercise. The individual data points for total time, split time(s), reaction time(s), accuracy, and precision as well as the overall score (T-Score™) can subsequently be saved for the marksman and compared to other marksmen's shooting metrics for competition purposes. Scores can also be assessed based on decision making, such as less-than-lethal response vs. lethal response and shoot/threat vs. no shoot/nonthreat.

The camera of the mobile computing device scans the clean target which is subsequently correlated with shooting drills that the marksman can complete for the corresponding target. Once a drill is selected, the mobile app guides the marksman through the drill and monitors shoot time and shot splits as the marksman completes the drill. To monitor total shoot time and shot splits, the mobile app uses the microphone on the mobile computing device to listen for shots fired. Once the drill is complete, the marksman can scan the marked target and the mobile app detects points of impact and subsequently produces a score based on one or more of the total time of the drill from start to finish, split times between shots, how close the impacts are to the designated location of the target (accuracy) and tightness of a shot grouping through triangulation (precision).

The mobile app portal operated on the mobile computing device by the marksman is in networked communication with a central server such that collected data can be saved for the marksman and accessed at a later date. In addition, the mobile app network allows marksmen to compete with other marksmen on the network by comparing obtained scores for corresponding drills complete on the same target type or a set of targets that are specified according to one of more of the drills. Further, the network allows marksmen to share and access video content and live instruction, forums, discussions, and other online applications and engagements.

In another aspect of the invention the mobile computing device is in wireless communication with a dynamic target stand that provides signals when it turns the target which allows the software application to automatically start the shot clock and produce split times based on the times that the targets are turned.

In yet another aspect of the invention, when it is used to train with laser fire, the start of the training is commanded by shooting a laser burst onto the target.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

The following description of the preferred embodiment(s) is merely exemplary in nature and is in no way intended to limit the invention, its operations, or its uses.

Figure 1:
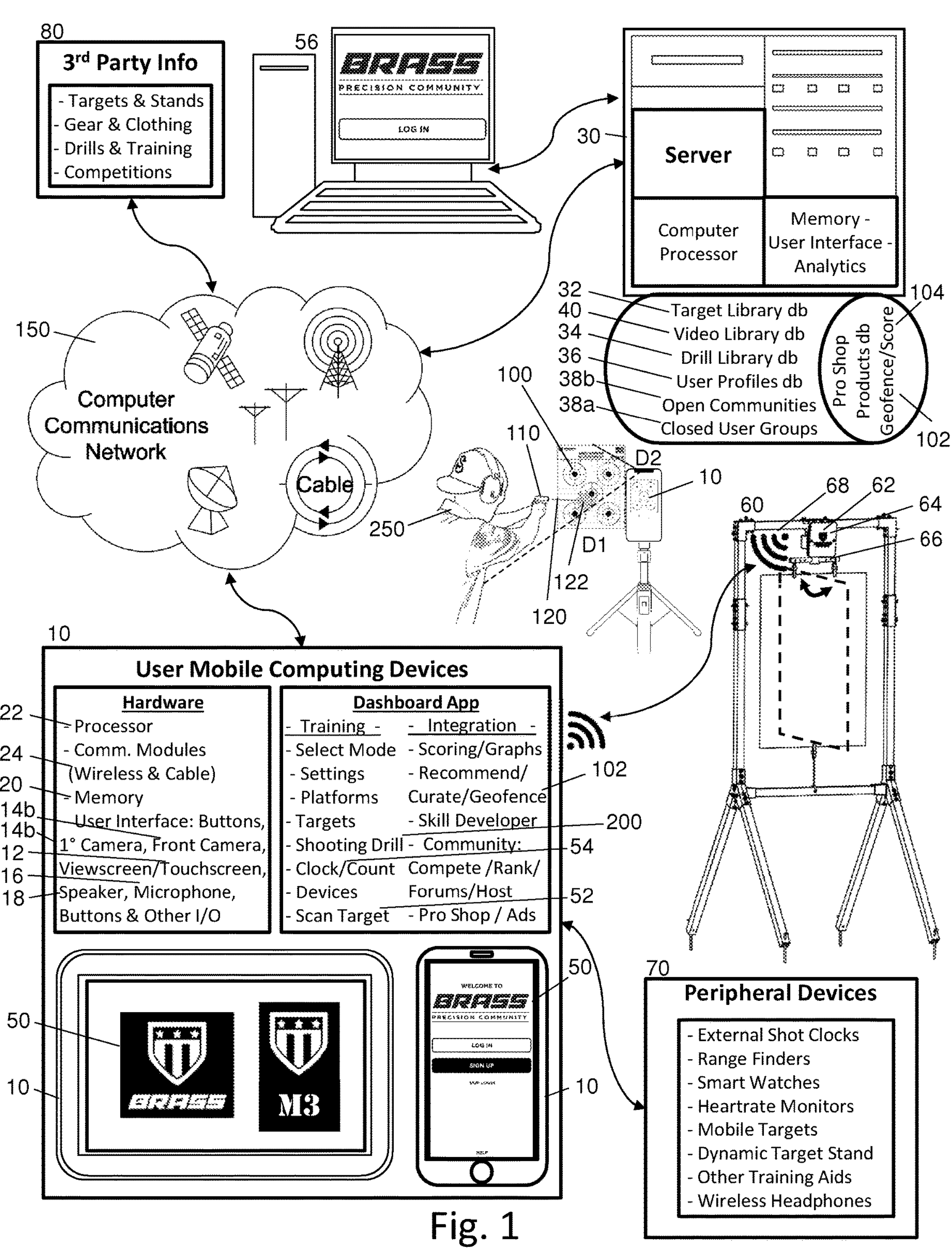
FIG. 1 is a schematic diagram of a marksmanship training system according to the present invention.

The hardware and software system of the present invention, known as Brass App and the M3 system, is shown schematically in FIG. 1. As described in detail below, the mobile computing device 10 runs a mobile app 50 with a target scanner 52 and a shot clock 54 to measure and record accuracy, precision, speed, and time within the hunting, shooting sports and recreation, and public safety (Law Enforcement, Military, and Security Services) industries. The mobile app is preferably a web-based software application that is in communication with a web-based central server 30 which allows end users to connect with each other online and facilitate training, competitions, and other online-based forums and communications. This also allows end users to monitor performance, both individual or someone else's in real-time and/or progression over time. This feedback loop will allow end users to train and be measured against objective standards. The mobile computing device has a touchscreen 12, a primary camera 14*a* on a backside of the mobile computing device opposite from the touchscreen, a front-facing camera 14*b*, a microphone 16, a speaker 18, a memory 20, and a processor 22, and a wireless communication module 24.

With the integrated system, users of the mobile app can challenge, communicate, or engage with anyone in the application (whose settings allow it) to create filters, compare scores of other users, and train to established standards or customized standards (or ad hoc training standards for scoring and/or drill procedures) and facilitate competitions, conduct training, track metrics, and receive pre-recorded and live professional training, coaching, other engagements online. The mobile app is integrated with a central server computer with networked communications between the central server and the mobile computing devices to provide improved communication and engagement between marksmen which creates a virtual shooting range in which the users can individually follow standard drills or customized drills and other training or can use the drills and training together. Each marksman can be a passive part of the virtual shooting range or can fully interact with other marksmen through the same mobile app, including training, skill building, conducting forums, coaching, determining real time results, and measuring progress over time. The virtual shooting range of the present invention also allows for competitions to be expanded beyond a local shooting range and provides for gamification of the competitions. Additionally, the virtual shooting range provides an interactive lifestyle platform that can resembles social media platforms like Facebook and/or Instagram for recreational users and like LinkedIn for professional users.

System users will use their mobile computing device to scan targets 100 for a variety of personal and professional services, including personal and professional training; recreational shooting; competitions; forums; and discussion rooms. The mobile app and/or the central server uses machine vision as the target scanner, detecting and recognizing the target automatically, and can make suggestions for drills based on the specifications and type of target it scans or recognizes from the extensive target database 34 which is stored in the server's database and/or in the memory of the mobile app on the user's mobile computing device as a library of targets. When a target is scanned by the camera, the mobile app and/or the server automatically determines the specification for the particular target and/or type of target for training (bullseye, multi-bullseye, silhouette, etc.). The users also have the option of entering the name or other specifications for a target in a search window, and the system will perform a text search for the target in the target library. For targets that are not in the target library, users also have the option of saving the image of the unmolested target for comparison with the post-drill target. The users can also use the mobile app to upload new targets to the target library for themselves or to be shared through the server with the entire community. The target library preferably includes different targets for training, recreation, hunting, and casual use or training.

It will be appreciated that the machine vision techniques to identify targets and the hits on targets can include machine learning and artificial intelligence techniques. For example, when a target being used cannot be found in the target library, the system may automatically try to determine the size of the target based on distance sensors that are a part of the mobile computing device's camera system, information from an external range finder that is in communication with the mobile app, the size of the target compared to other known targets in the target library that the mobile computing device's camera system has imaged in the past, and/or the relative size of a known target stand that is used to hold the target, such as the target stand used in Triumph Systems' PIVOTAL TRAINER® target system. The processor can also use an image of the marksman from the front facing camera on the side of the mobile computing device with the touchscreen to determine a total distance from the marksman to the target. The image from the front facing camera is used to determine the distance (D1) between the marksman and the mobile computing device, and the image from the backside camera is used to determine the distance between the target and the mobile computing device (D2). The total distance can be used to confirm training distances and verify the marksman's position which could be important in virtual competitions. If a marksman is not compliant with the distance or other drill instructions, the system can flag the noncompliance and the administrator can disqualify them.

When presented with an unknown target, the system may also automatically search target images and other target repositories that are available through the internet to determine whether the size information and other specifications can be determined. Accordingly, in addition to using machine vision pattern matching algorithms to identify a scanned target to a known target in the target library, the present invention provides additional capabilities to better define previously unknown targets.

Figure 2:
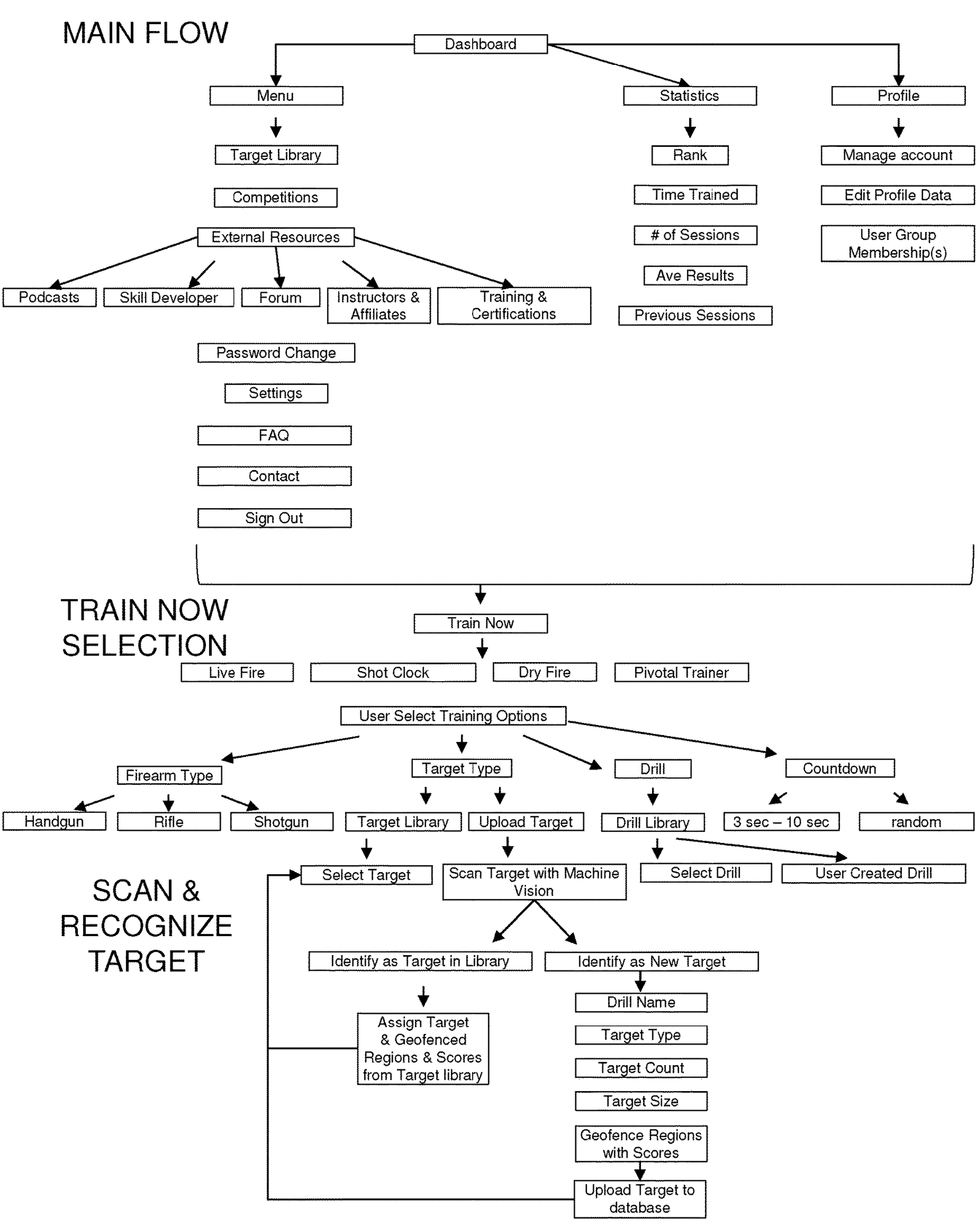
FIG. 2 is a flowchart of the main menu operations according to the present invention.

The flowchart of the main menu operations is shown in FIG. 2 with a training selection and target scanning functionality features, and the functionality of the system's features and operations are summarized in the table below.

Figure 8:
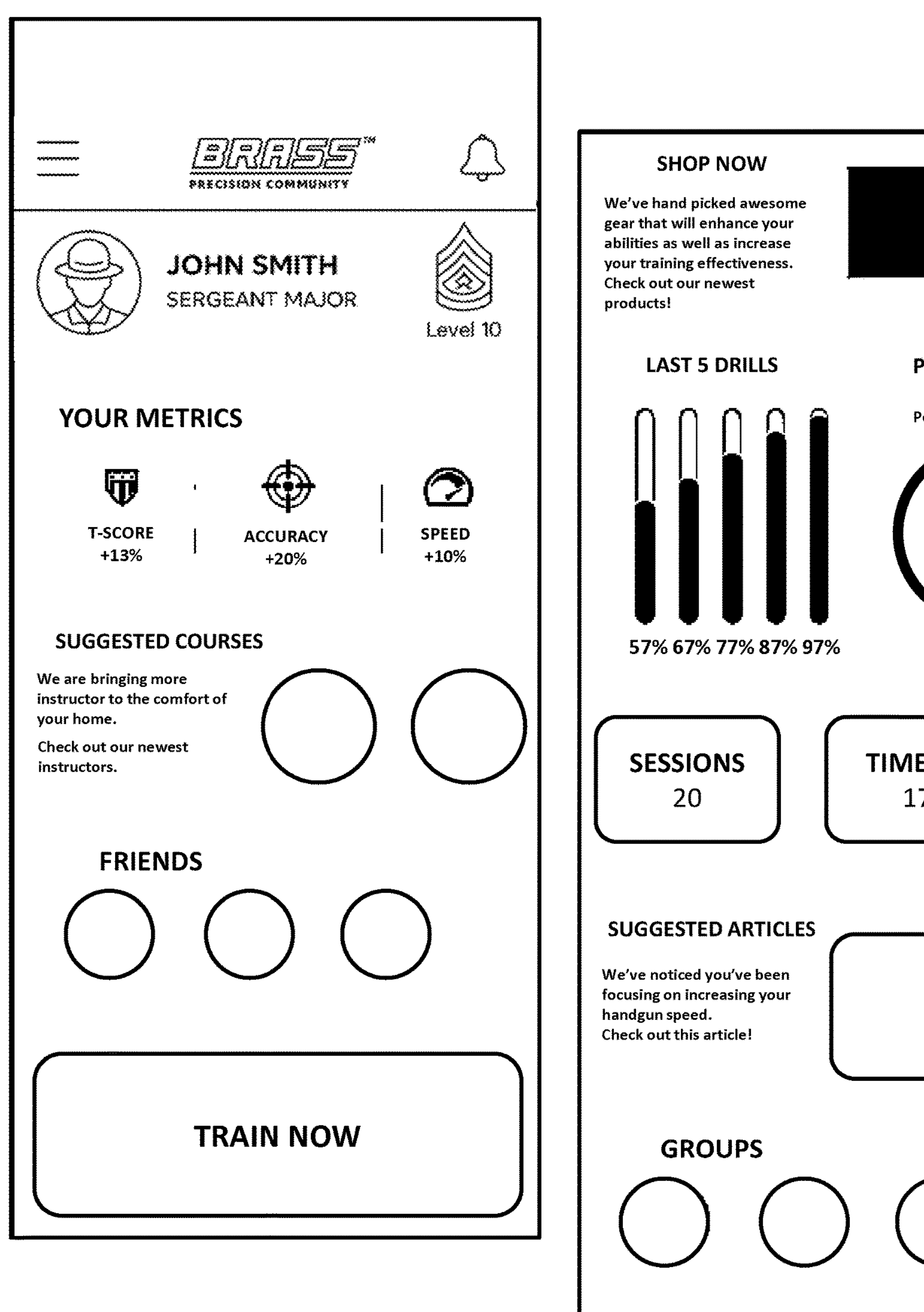
FIG. 8 is a screenshot of a home screen dashboard according to the present invention.

| Feature | Short Description |
|---|---|
| | Shot Clock |
| Scoring Algorithm Based on Decibel | The scoring algorithm works with different drills. Each drill sets a total baseline time to accomplish the drill. The algorithm has the type of firearm being used and calibrates the shot clock to function within a certain decibel range for the chosen firearm. Once the drill is completed the algorithm will output the users total time score, which is plus or minus against the baseline time as well as the split increments |
| Results | Reaction time, split time(s), and total time |
| Cloud Sync | The application can function nearly entirely without external communication (i.e., offline). When there is no signal or connection to the central server, the application will not be able to sync data to the server until external communication with the server is restored. With Cloud Sync, when the application is used offline and comes back into communication with the server, the application will upload user scores to the profile on the server (linked to the user profile on the website). Data on users' mobile devices sync with online data for the users' respective profiles. |
| | Targets |
| Target Upload | User scans and uploads a target image to the system. |
| Approval workflow for uploaded targets | Users can save their own targets to the application and may be able to save uploaded targets on the server. When the target is saved to the application, the user can use the target immediately, but before an uploaded target is allowed to be saved to the server, it is evaluated to confirm the target is truly not already in the target library and to ensure that the target is relevant before being approved for saving. The system protects against users building a database of personal targets. |
| Targets Library | Targets in the Target Master & other targets uploaded by users but not in Target Master. |
| Target board image process | Using machine vision techniques, including machine learning and artificial intelligence, the uploaded image is identified. |
| Mark hits on Target boards | Using machine vision techniques, including machine learning and artificial intelligence, the hits on the targets are identified. |
| | Real time/Dry Fire |
| Dashboard | The mobile app's dashboard and information for the dashboard are available offline. |
| Level (- Cloud Sync) | For users who approve the sharing of their scores, the server creates a ranking system. As users perform more drills and build up experience (XP) points, they are rewarded with higher rankings (similar to military insignia rankings). In offline mode, the mobile app doesn't pull new icons/ranks, but when communication is restored and the user's latest scores can be compared to other users, the system updates the rankings. |
| Average Result (Mobile DB-Offline) | As a quick performance summary, the user's dashboard shows the average score (T-Score) for accuracy, precision, & times. |
| Most recent session (Last 5 section mobile DB-Offline & Online) | The home screen dashboard illustrated shown in Figure 8 displays the user's trends from their last five (5) session/drills (or some other number) with an evaluation on the trend (improving, declining, or staying the same). |
| Permission (Camera & Microphone-Allow Access) | Before scanning a target to begin a drill, the user allows the mobile app to control their mobile computing device's camera to take photos and the microphone for the shot clock to register the sound of the shots. |
| Firearm | The user chooses a firearm type (Pistol, Rifle Shotgun - or multi firearms). |
| Shooting Drill | Based on the firearm type selected, the mobile app provides the user with optional drills to accompany the chosen firearm type. |
| Intro Page | The user is introduced to the drill via video or step by step instructions, the user is provided with requirements for the drill (Loadout, Distance from target, par time to complete drill). |
| Session Starts | When the user is ready to begin the session, the user starts by pressing a button which starts a countdown (specified by user preferences) to the start of the drill. |
| Session End | When the drill is completed the user presses stop on the mobile app which prompts the user to finish and scan the target. |

-continued

| Feature | Short Description |
|---|---|
| Take Snap | Photograph the target after it has been impacted by the projectiles. |
| Mark Hits | The system analyzes the target for impacts and marks the target with green and red symbols to indicate where the user hit the target. |
| Session Result | Once all hits and misses on the target are complete, the system analyzes the session and outputs the user's score for the drill. |
| Algorithm Offline | The algorithm works offline to produce scores the same as it would in online mode. The only difference is the data won't sync to the server until the user gains access to WIFI or data, but it is still stored on the users smart device. |
| Cloud Sync | See Cloud Sync in Target above. |
| | Data Stored in Database/Backend |
| User Profile | The user profile contains information about the user that the user can customize, such as with a user image & background banner. Details include the user's rank level, skill level, subscriptions plan, renewal date of subscription, personal email, and other information. |
| Target Master | Targets available from one or more target manufacturers. |
| Session Data | Realtime, dry fire & shot clock data can be stored in the server database. |
| Scores & Results | The scores and results for users can be stored in the server database. |
| User Groups | Open Communities (public shooting clubs, open leagues) & Closed Groups (military units, law enforcement agencies, private security teams, private shooting clubs, competitive leagues) |
| Firearms | specific firearm, ammo, environment, audible signature, caliber, decibel |
| Subscription-Transaction (non-PCI data) | The system saves data on customers related to their subscriptions & payment options, including name, address, etc., but not holding the credit card number (PCI data is data related to specific credit card information). |
| Reports-(Payment, Subscription List, User List, Target List, Gun Types, Decibel List) | |
| Subscription Management | |

The mobile app and/or central server can include a knowledgebase of drills that correspond to targets in the target library and recommend a shooting drill 200 to a marksman 250 based on the specific target detected that is scanned or otherwise recognized in the target library. The user will select the drill they want to do, or make their own, and will preferably identify at least the type of firearm 110 being used before executing the drill using the shot clock. The smart shot clock can work in an audible mode, a visual mode, or both audible and visual to provide a real-time feedback loop that measures and records overall time and split time. One or more of the split times can include a reaction time, such as the times between the turning of a target to a threat side to the time that the marksman takes the respective shots 120. When the drill is completed, the user will re-scan the target and the application will automatically register the impacts on the target. When using laser shots, the application registers the laser burst impacts 122 while they occur, and as explained in detail below, ballistic shots 124 are preferably determined at the conclusion of the drill although they could also be determined immediately and recorded during the shooting drill. When the application misidentifies an impact zone or fails to identify an impact, such as with a keyhole shot, the user can manually correct or register the impact. The system produces scores for accuracy, precision, and time and also calculates an overall composite score (referred to as the T-Score™) that is based on a combination of accuracy, precision, total time, and speed (split and/or reaction time).

Figure 11A:
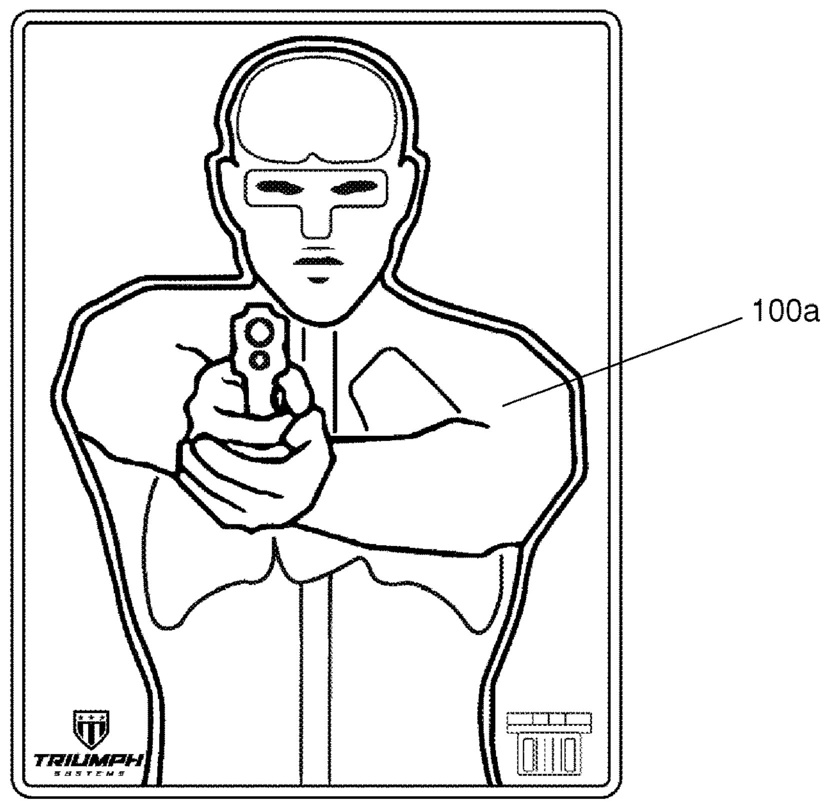
FIGS. 11A and 11B are images of the threat side of a target and the nonthreat side of the target, respectively.
Figure 11B:
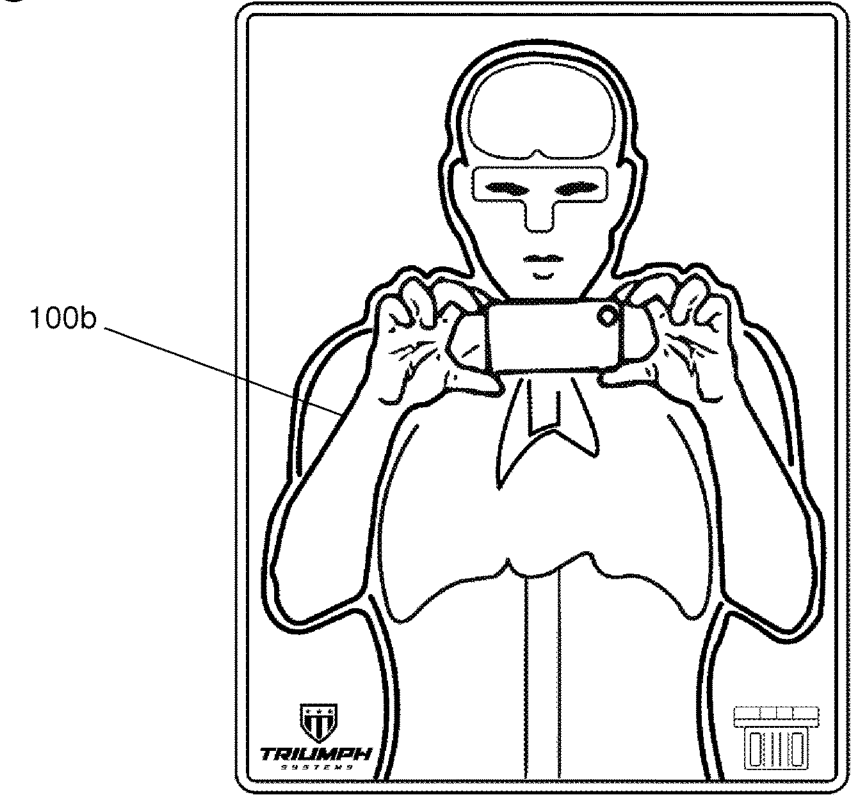

It will also be appreciated that scoring can be based on target specifications that include geofenced regions 102 in the respective target images and a corresponding set of score values 104 for the features of the image in the geofenced regions. Although standard bullseye targets and targets with simple geometric shapes have different scores associated with the radial distance of the concentric rings from the center bullseye, there is no geofencing capability and scoring differential for animal targets or humanoid targets. With the geofencing of a humanoid silhouette target, such as the b-27 target, a chest hit and a cranium hit can be scored differently than a hit on the shoulder or arm. It is also possible to provide for a differential in scoring based on the particular location in the chest and the head. For example, on the threat side of a target 100*a* as shown in FIG. 11A, there can be different additions to a score depending on the location of the shot in the geofenced regions. Also, as described in detail below, there can be different deductions to a score depending on the location of the shot in geofenced regions of a nonthreat side of a target 100*b*, such as shown in FIG. 11B. Similarly, the geofenced regions of targets could be used by hunters who are training on ethical harvest of their game. Although some other target shooting apps that score using machine vision allow users to upload targets, the present invention is the only app that allows individual users and user groups to geofenced targets for customized scoring.

Figure 3:
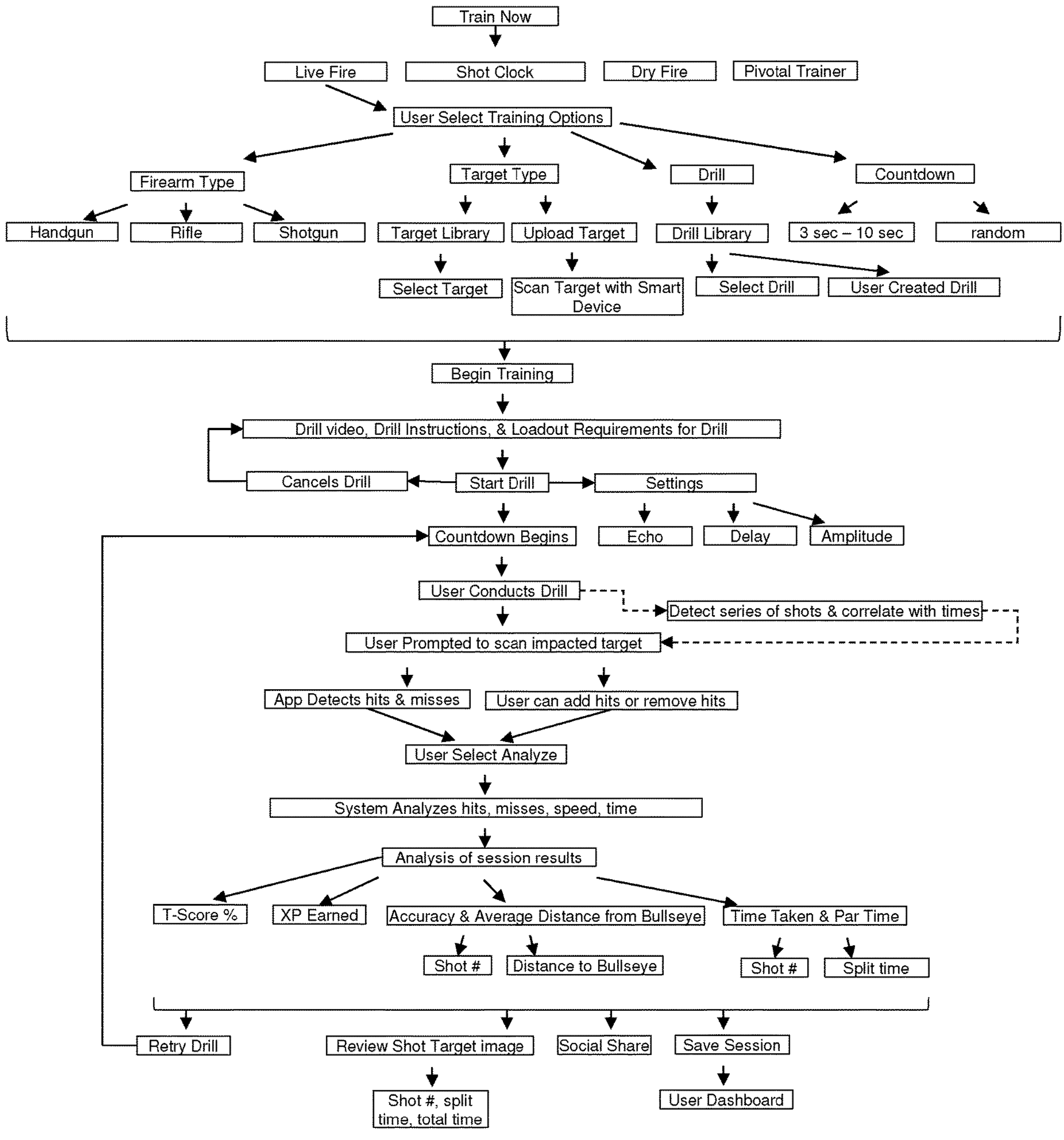
FIG. 3 is a flowchart of the live fire operations according to the present invention.
Figure 4:
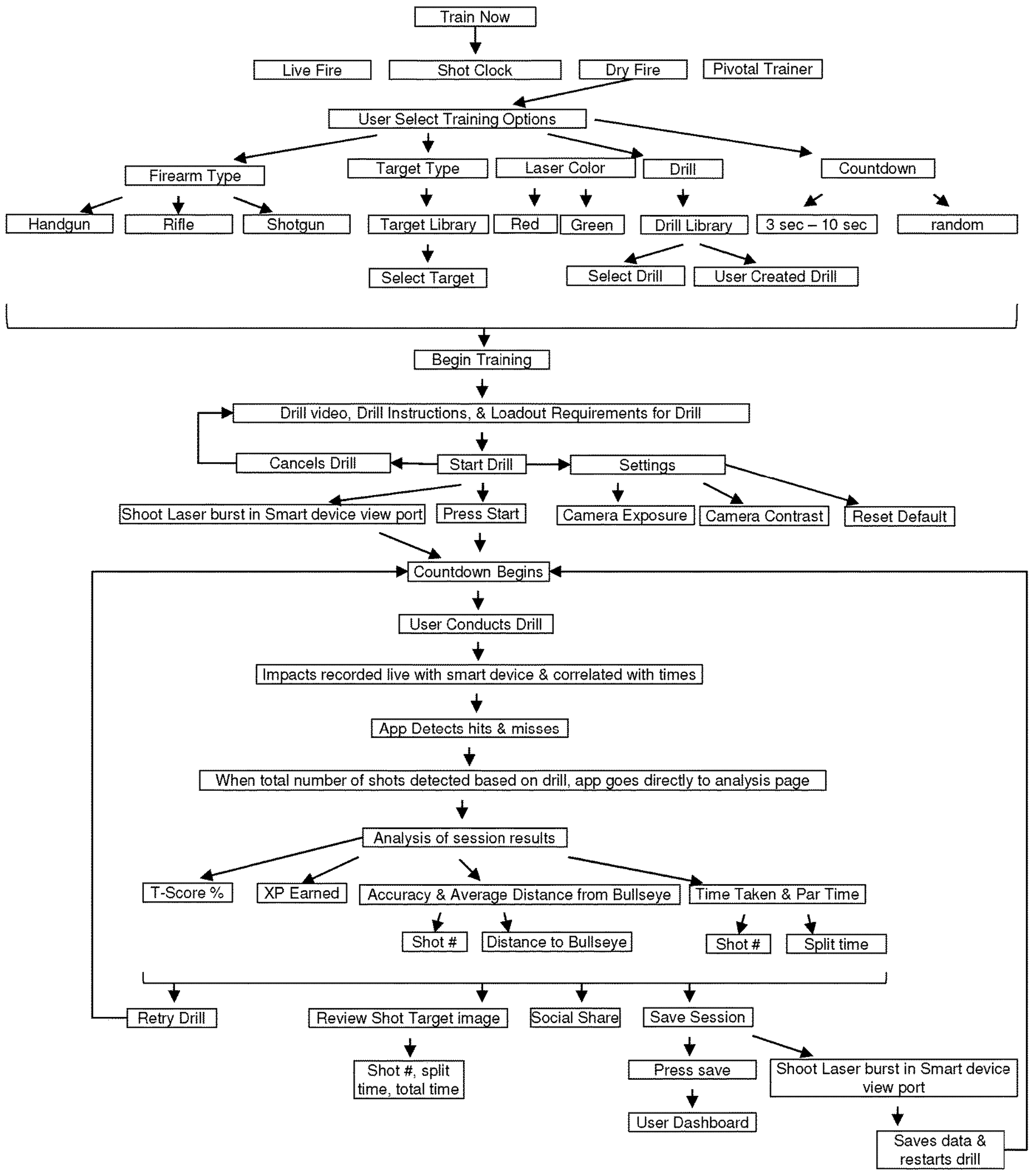
FIG. 4 is a flowchart of the dry fire operations according to the present invention.
Figure 5:
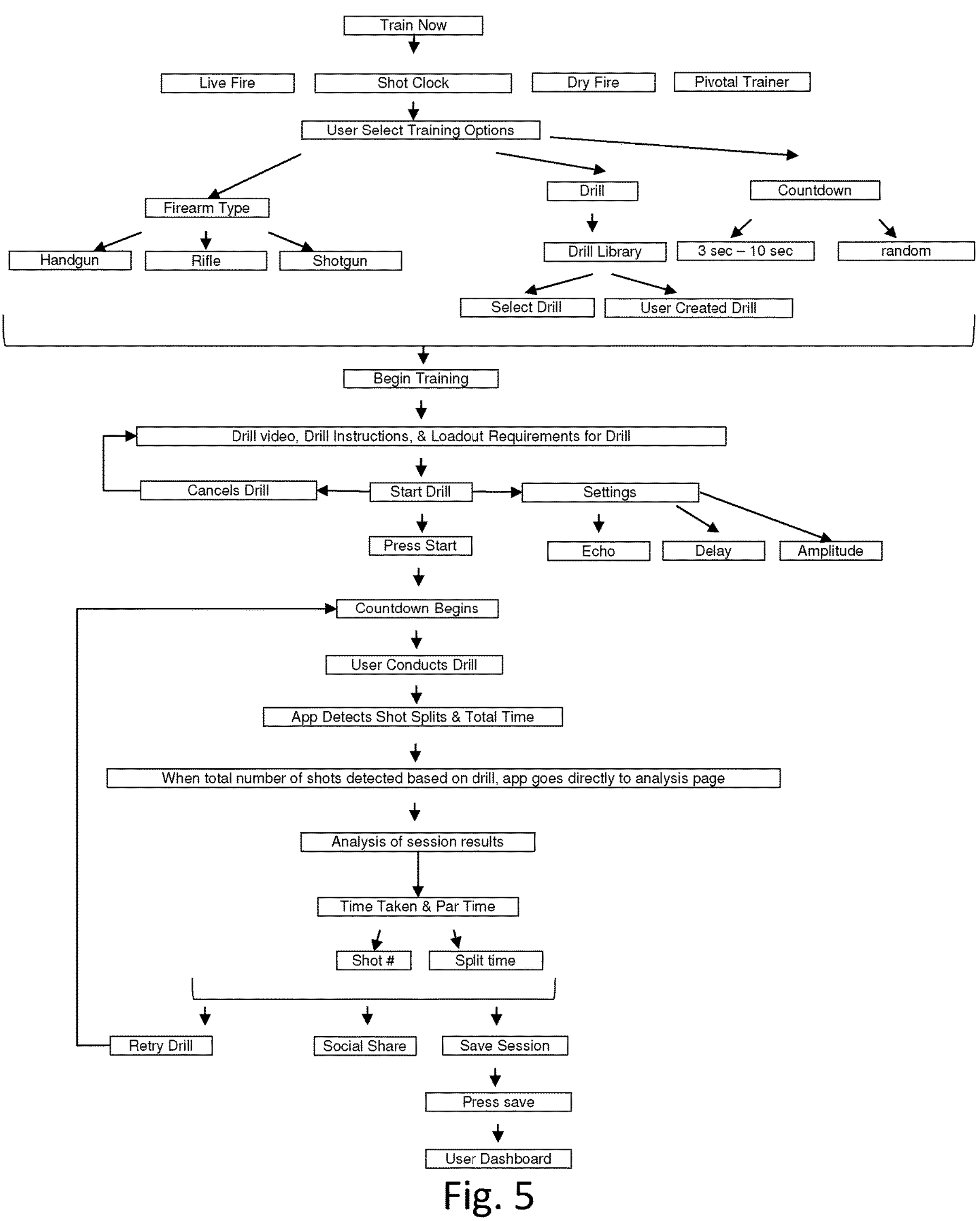
FIG. 5 is a flowchart of the shot clock operations according to the present invention.

The steps in a method for guiding a marksman through a shooting drill are shown in FIGS. 3 and 4 for a live fire drill and a dry fire drill, respectively, and the steps are also described in more detail below. Similar steps for the shot clock drill are shown in FIG. 5. In the shooting drill, a series of shots are fired at a target, the shots that hit the target are scored, and performance of the marksman is tracked. The shot clock is started according to an initialization signal from the processor and is restarted according to a set of reinitialization signals from the processor. Depending on whether the drill is dry fire with laser shots or live fire with ballistic shots, either the camera or the microphone is used to detect the series of shots fired at the target and the corresponding series of time periods with no shots fired between the series of shots. In particular, the camera detects a laser burst impact on the target as each of the shots fired at the target, and the microphone detects a gunpowder blast as each of the shots fired at the target. As explained above, it will also be appreciated that the camera can be used to identify physical ballistic strikes on the target with the sound of each gunshot triggering the camera to take a picture.

The mobile computing device's processor determines a set of times according to the shot clock. The set of times correspond to a start time and a series of split times corresponding with the detection of the shots in the series of shots fired at the target. The camera captures a set of images of the target with one image of the target not having any strike and at least one additional image having one or more strikes. The processor determines a location of each strike on the target for the corresponding shots according a comparison of the image of the stricken target with the image of the unstricken target. As described in detail above, the processor determines a set of accuracy values corresponding with the set of shots relative to a predefined point on the target and a precision value for the set of shots relative to each other and the predefined point. The processor also determines the total time for the set of shots and the split times for the set of shots from the corresponding initialization and reinitializations of the shot clock. The processor calculates the score based on the set of accuracy values in combination with at least one of the precision value, the set of split times, and the total time, and the score of the marksman for the shooting drill is saved in the memory.

When the machine vision has identified the strikes, the touchscreen preferably displays a set of visual indicators overlaying the set of strikes. As explained above, the user is given the option to manually add another visual indicator to the image of the target on the touchscreen as a strike on the target even when the processor did not determine the strike in the set of strikes in comparing the images of the target.

When in the dry fire mode of operation and the machine vision is being used to score laser bursts on the surface of the target, the system is configured to use laser burst to start a drill and save the results from a completed drill. When the user has selected the drill they want to do, the user can initiate that drill by shooting a laser burst at the target. This means that the user can get in his/her position and ready themselves prior to the drill beginning and can shoot a laser burst at the target which is spaced a distance away from the mobile computing device to start the drill countdown. This means the user doesn't need to physically touch the app to initiate a drill. Once the drill has been completed, and the app shows the user their score, the user can then shoot a laser burst at the target to save the scoring output from the prior drill session. This laser burst will save the session and begin the same drill again.

In addition to saving and starting the sessions, the laser burst control could be expanded to select other control functions. For example, when the software application is displaying the analysis page on the touchscreen, the user could shoot in particular areas of the target, or on the surface in the field of view of the camera, to select different actions. A shot on the bullseye could save the last drill results and start a new drill while a shot in the top left goes instructs the app to display the impacts from the last drill, and a top right shot could be an instruction to send out the results of the last drill in a social share based on a previously defined social connection.

Generally, when the laser burst is used to start a drill, the camera detects a first instance of the laser burst on the target surface. The machine vision identifies the laser burst at the point that the drill has been selected and prior to the drill beginning and retrieves from the memory the command to start the countdown for the drill to begin or whatever other command is associated with the detection of the first instance of the laser burst. The app then implements in the processor the first command. As indicated above, after the end of the drill, the machine vision may detect another instance of the laser burst on the surface. The app retrieves from the memory the command to save the results from the drill and to reset the app to again begin the drill.

A significant benefit of laser burst control is an increase in the efficiency of practice sessions. With the laser burst control feature, users can initiate a new drill simply by shooting the target, without needing to physically reset the target or make other adjustments. This can save significant amounts of time during practice sessions and make practicing more convenient for users. For example, if a user is practicing a timed drill and wants to do the drill again after each attempt, using a laser burst to initiate the drill can save several seconds each time. Over the course of multiple attempts, this can add up to a significant amount of time saved. Additionally, users don't need to interrupt their flow of practice to physically reset the target or make other adjustments, allowing them to maintain focus on their shooting skills.

In addition to allowing for more efficient practice sessions, the laser burst control feature also has benefits for users in terms of their ability to focus on their shooting technique. When using traditional dry fire shooting methods, users may need to spend time physically resetting the target or making other adjustments between drills. These interruptions can break their concentration and make it harder to maintain focus on their shooting technique. With the laser burst control feature, however, users can initiate a new drill quickly and easily, without needing to be distracted by other aspects of the drill setup. This can allow them to maintain their focus and concentration on their shooting technique throughout the practice session, leading to more effective and productive practice. The laser burst control feature can help users to build muscle memory for their shooting technique. By allowing users to initiate a new drill quickly and easily, the feature allows for more training cycles which ultimately means more training in less time, thus building up their muscle memory cycle at a more expedient rate.

As with prior art systems that use machine vision to identify and score laser shots, the system of the present invention allows users to manually adjust the camera exposure and contrast to improve the recognition of laser bursts on the target. The present invention can also automatically adjust the exposure and contrast depending on the ambient settings to calibrate for optimizing the laser burst recognition. For example, when the target is in a bright room, the camera would reduce the exposure and darken the image so the laser bursts could be better captured by the camera.

Figure 9:
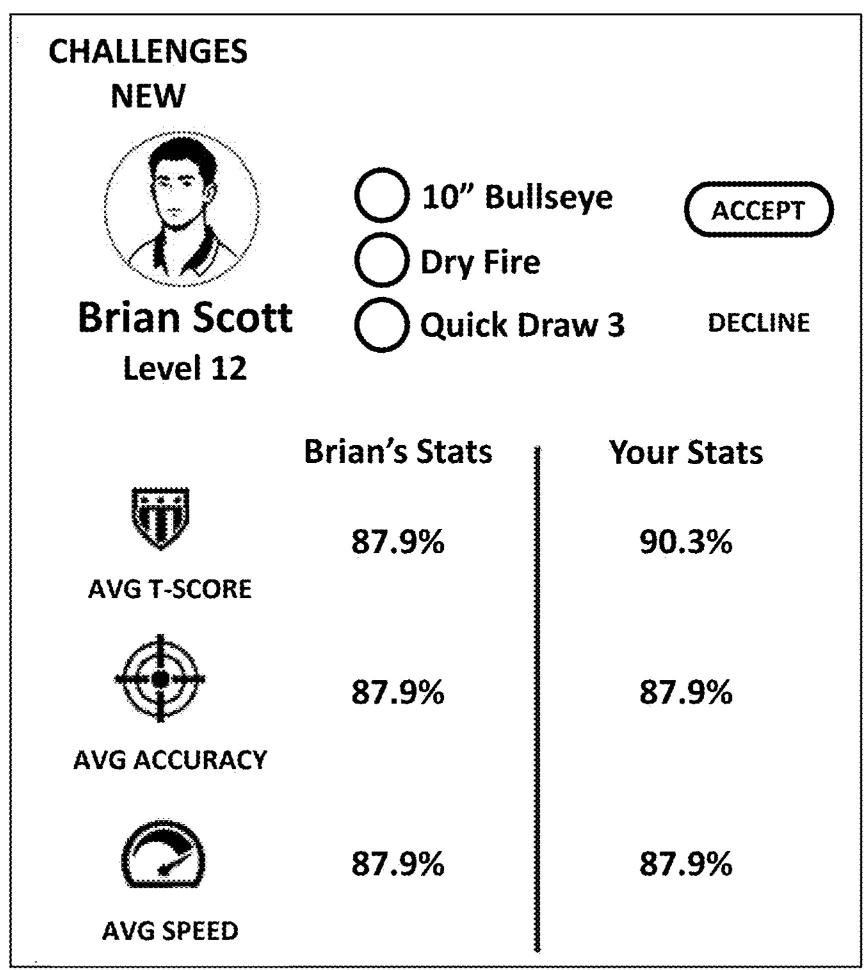
FIG. 9 is a screenshot of a challenge screen dashboard according to the present invention.

Users can challenge other users to competitions for which the recipient may either accept the challenge or decline the challenge as shown by the challenge screen dashboard in FIG. 9. The challenge can be accepted or declined and is won based on the output from the T-Score™ where the best score wins. Wins/losses, challenges, rankings will be placed on a leaderboard for user to review and see how they go up or down the leaderboard as they use the application over time. Leaderboards are based on the end users' settings and can be completely public or based on a specific filter. Additionally, the metrics for organizations like Law Enforcement, Military, or a private group of individuals can be created for internal uses only. Specific to Law Enforcement and Military application, the dashboards can be looked at by those with authority to review the any individual or group within the organization. Customized drills and other training standards can be uploaded to the server or otherwise shared between agencies. It will be appreciated that scoring can be based on agency or other specific objectives and can be built and customized to the customer-Agency specific targets and/or drills would have limited access. The system could also have custom programmed drills specific to one user.

The system will recommend content for the marksman based on their user preferences and scores, challenges over time, and personal preference based on their user profiles 36 and their habits/digital footprint/user history and trends. They are also able to take live instruction through the application from professionals, influencers, and subject matter experts. Additionally, the application can also include a pro-shop where users can purchase outdoor sporting goods related items directly through the application or be redirected to third-party websites 80 for products such as equipment, gear, and clothing or for services, such as specialized drills, training or other instruction, and competitions. Accordingly, the dashboard of the mobile app integrates features and functionality that, prior to the present invention, would have required users to launch separate software applications. Additionally, the known separate applications do not permit the sharing of data as in the present integrated application, and without the sharing of data between these separate applications, the marksmen would not be presented with recommendations based an integrated evaluation of their skills, abilities, goals, desires, and other interests. In the integrated software application of the present invention, scoring metrics and user input are used to automate and generate recommended content for user skill building, discussion groups, targeted advertising, and other online forums.

The application scans targets using the mobile computing device's camera feature and recognizes the type of targets being scanned or targets that are in the target library. The user can add their own targets to the library if their target is not able to be read or found in the existing library. Once scanned, the user can choose their training platform, whether it be with archery, air rifle, pistol, rifle, shotgun, or laser training. When selected, the software application provides options for relevant drills based on the target specifications, type, and training platform chosen and proceeds to explain the selected drill through a demonstration video or via text. Then the user is prompted to start the drill. Additionally, as discussed in detail below with regard to the skill developer tool, users can use its recommendations and apply its functionality in combination with the target library, the scoring analytics, the smart shot clock, and other peripheral that can be integrated into drills to create their own formulated drill procedures. Users can keep their formulated drills private to themselves or may make them available to one or more user groups and/or users with special access to a particular agency's drills, and users can also make their formulated drills publicly available.

For live fire drills, bolts, arrows, or ammunition with static or mobile targets, once start is initiated; start can be initiated by a mobile target activating or the smart shot clock beeping to signal to the user that the drill has begun and begins to count total time and splits between each shot until the drill is completed. Now that the drill is completed, the user uses their mobile computing device to scan the target again. This scan automatically detects the point of impacts on the target or allows the user to use their finger to place the shot locations on the target. When shot locations are confirmed automatically and/or manually by the user, the application produces a T-Score™ based on the objectives of the drill, with the basis being how close the impacts are to the designated location of the target (accuracy) and may also include precision in a shot grouping through triangulation and/or overall time of the drill from start to finish which may also include split times between shots. Each one of these component scores are metrics that can be stored as historical data points for the users with separate scores for total time, split time, accuracy, and precision as well as an overall score (T-Score™) that is a composite of the component scores. This feedback can be measured and recorded on a percentage basis or can be quantified in terms of units of distance depending on the target specification, type, and end user input.

There are numerous ways of scoring different drills, and the present invention provides objective commonality that users can apply in scoring. For example, scoring accuracy for each individual shot can be automatically calculated by measuring the distance between the center of each impact location on the target to the goal location for each corresponding shot. Accordingly, the scoring accuracy results in a score for the first shot, a score for the second shot, etc., and can be drill dependent. This scoring can be measured in at least a couple of ways and can be presented as a percentage and/or as a unit of distance if the target size has been input by the user or is otherwise known (such as in the target library or hardware with known dimensions). The first way it is measured is the distance (% and/or unit distance) from the center of the target (bullseye) to the center of the bullet hole, impact zone, or the center of the energy burst (the laser). The second way can be measured (as a % and/or known distance) is creating a X and Y grid where 0,0 is the exact center of the bullseye or the center of the target and then taking two (2) measurements. The first measurement is the distance on the x grid from the Y axis and the second is the measurement is the distance on the Y grid from the X axis. These two (2) scores are combined and then converted on a scale to produce and overall score. Scoring precision uses a similar process, but the system automatically selects the 'center point' through triangulation for a shot group that can be automatically determined or manually selected. Using this data, the end user can continue to skill build on both precision and accuracy. Scoring speed is generated automatically by measuring the time between each shot (splits), resulting in a score for the cumulative of splits for the drill. Scoring time begins when the smart shot clock beeps a mobile target activates/turns and presents a threat.

The mobile app's smart shot clock can wirelessly communicate with turning target systems and other wirelessly controlled dynamic target stands 60 which have a turning unit with a motor 62 in operative communication with a computer controller 64 and which also have a target holder 66 that holds the target. The dynamic target stand preferably includes a wireless communications module 68, such as Triumph Systems' PIVOTAL TRAINER® target system. The smart shot clock provides the end user and authorized parties the ability to automatically measure and record reaction time. Instead of an audible indicator to begin the timer for the smart shot clock and record the time it takes an end user the complete a drill, the timer would automatically be initiated by a signal that the dynamic target stand's computer controller sends to the mobile app which indicates that the target is beginning to turn or otherwise move to a threat position or a 'shoot target' being presented. Other peripheral devices 70 can be in communication with and integrated into the mobile app, including the smart shot clock functionality. For example, the mobile app could wirelessly communicate with a heart monitor device, such as found on some smart watches or standalone units, to also provide data to the end user or other authorized entities to measure and record how the user's heartrate impacts performance. For example, increased beats per minute (BPM)

could be indicative of stress. Other biofeedback sensors may also be used with the system, such as moisture level sensors to measure perspiration as well as other sensors that may be developed in the future, such as an adrenaline level sensor). Knowing the data can aid in stress inoculation training. As another example, the mobile app can wirelessly communicate with a laser distance measuring device or other range finder to determine the distance between the user and the target for the scoring, data metric tracking and for normalizing competitions. The smart shot clock may wirelessly connect with an external shot timer to populate data from the external device into the application for scoring and data metric tracking purposes.

As another example of a wireless peripheral device in communication with the mobile app, a visual aid such as a projector can be integrated into the system. The mobile app is synchronized with the projector and can provide a series of scenario-based training options to choose from in combination with the integrated projector. Once the user chooses a scenario, the mobile app has information on what can play out and can measure a user's reaction time, accuracy, among other data that is gathered from biometrics, such as the heartrate described above and other biometric data as explained in more detail below. The projector would be projecting on any blank flat surface (plain paper, cardboard, or similar). The user could still scan the paper with the projection on it and be scored just like any other scoring.

It will be appreciated that other biofeedback sensors can be integrated with the system. A voice recognition/voice stress analyzer can be used to evaluate stress levels of trainees under different conditions and how changes in voice have a positive or negative effect in the response received. Gait recognition and/or accelerometer devices can be used to evaluate users' movements, footwork, handwork, overall posture in order to evaluate mobility and dexterity, training mechanics and response times. VO2 sensors can be used to determine rates of oxygen consumption for trainees in different situations and may be correlated to trainees' performance levels for different tasks. Cortisol sensors can be used to determine trainees' overall stress levels Skin conducting sensors can be used to determine neural activity in the sympathetic nervous system for evaluating stimulus/decision making Eye tracking and pupil recognition sensors can be used to evaluate target acquisition time and response time to engage.

For laser drills, the mobile computing device is placed in a position where the camera points at the target for static or mobile targets. Just like above, once the start of the drill is initiated, the smart shot clock beeps and/or may flash an image on the touchscreen, or for turning or moving targets presents a threat or 'shoot target' to signal to the user that the drill has begun and begins to count total time and splits between each shot until the drill is completed. The mobile computing device's camera uses the live video image to detect laser impacts on the target during the drill, training, or competition and records the laser impacts on the target. When the drill is complete, the mobile computing device shows the user the impacts on the target similarly to how it was done with live fire producing a T-Score™ by calculating, overall time of the drill from start to finish, split times between shots, how close the impacts were to the designated location of the target (accuracy) and average your shot grouping to determine your precision. All these components result in not only individual data points for total time, split time, accuracy, and precision but also an overall score (T-Score™). It will be appreciated that the laser shot can be from a training firearm, such as the SIRT firearm trainer, TASER nonlethal stun guns, after market laser devices and other platforms with lasers, or a training round that can be used with the dry fire of standard firearms, such as the "magic bullet" laser ammunition in which the accessory is internal and compatible with the firearm.

The "magic bullet" laser ammunition does not require any mounting hardware nor anything attached to the exterior of the firearm because it fits in the chamber of the firearm and produces a laser beam that shines out from the firearm's barrel when the trigger is fully squeezed and the firing pin makes contact with it. Accordingly, the standard holster for the firearm can be used during training with the "magic bullet" laser ammunition. For those platforms which require hardware on the external surface of the firearm for mounting an external laser shot training device, the outer shape of the firearm is necessarily changed, rendering the modified firearm no longer compatible with the firearm's standard holster.

It will be appreciated that the system could use the video feature of the camera combined with machine vision to determine physical ballistic impacts on the target in real time, as they occur, similar to the laser strikes on the target. In U.S. Pat. Nos. 10,077,969, 10,670,373, and 10,876,818 which are incorporated by reference herein, a separate machine vision device that is located downrange from the marksman is required to be placed close to the target while the software application is running on the mobile computing device that is located with the marksman. In the present invention, the machine vision is in the mobile app running on the mobile computing device that is located with the marksman rather than being located downrange. Rather than using a machine vision device closer to the target, such as in long range training, the machine vision in the mobile computing device can be enhanced by connecting it to a telescope or other telephoto lens so it can accurately evaluate the shots on the target from the longer distance such as envisioned in U.S. Pat. No. 9,253,383 which is also incorporated by reference herein. As an alternative to using the video feature of the camera to identify physical ballistic strikes on the target, the sound of each gunshot could trigger the camera to take a picture, and the processor can use machine vision to identify the strike for each corresponding shot.

Once the drill is completed the user will gain experience points which grows over time, frequency, and duration based on how often the user engages with the applications and completes drills and challenges. The scores for each metric, i.e., total time, split time, accuracy, precision, and T-Score™ are recorded individually under the user profile(s) based on the user's privacy settings. This aggregate data will be used by the software application to provide graphs of end user average scores and generate recommended content, targeted advertising, training, and more. Additionally, it will provide the user with an experience rank based on performance, frequency, and duration of drills, competitions, forums, and other engagement. The data and recommended content will be populated in the user profile section of the applications, as well as through a secure login via a website. It will be appreciated that the mobile app integrated with the server allows users and/or user groups to virtually challenge each other, and the system allows users to facilitate and host competitions. The server is a web-based platform that can be accessed from anywhere in the world with internet connection through a computer communications network 150. Accordingly, the system allows for globally ranked virtual shooting tournaments and competitions for the users as well as globally available training content and forums that are both live and recorded. The system also provides globally available access to firearm and archery instructors through online forums that provide data from end user to instructor via a real-time feedback loop with the smart shot clock, range finders, and other peripheral devices that can provide objective standards and can be used to normalize results.

A completed drill can be used to challenge other users on the application to competitions or engage in training drills, discussion, and other online forums. Best score wins; and a tie results in a shoot-out (players can take tie or agree to a shootout-different drill); however, both users gain valuable data, metrics, and build recommended content for their profile as well as experience points. A win/loss/tie record will also be recorded into the user profile. The competition section allows users to not only challenge others directly but to team up in groups and compete against other groups where an average of each user's T Score™ will be used to determine a win or a loss. Users can challenge each other on a drill based on a category of the drill and the privacy settings of the users. Rankings for all competitions will be listed on a global leaderboard for user vs. user, user vs community, and group vs group. This leaderboard can be filtered to include only select other end users, can be based on geography, can be based on experience points, can be based on similar skill level; it can be fully customized based on the end users' filters.

The smart shot clock is an in-software application that measures and records a data record for total time and splits using the mobile computing device's integrated microphones. The features of the smart shot clock will allow users to save sessions, review history of session, alter par time, and start delays. The smart shot clock also communicates with external shot clock timers, for which the data record would be recorded using the external devices microphones and timer, but the data is populated from the external device to the application on the mobile computing device for use in your profile. The smart shot clock can be used in audible mode only, visual mode only, or both audible and visual mode. The smart shot clock and standardized scoring is also helpful in normalizing competitions and can be used in providing a handicap to marksmen with different skill levels that compete in a challenge.

A handicap could work similar to handicaps that are used in golf. Multiple competitors that have performed the same tasks will have scored differently depending on the competitors' various skill levels. The past performance of the competitors would be used to predict future results, and the handicap would account for the skill level differences so the competitors would theoretically tie each other so it acts as an equalizer of skills based on past performance. As an example, you can take a speed drill which is five (5) shots as fast as you can from ten feet (10') on a ten inch bullseye target (10" BE). To establish a handicap, this task or some other basic drill is preferably performed three (3) times. One competitor averages a score of six (6) in accuracy out of the perfect score of ten (10), and it takes him four (4) seconds on average Another competitor averages a score of five (5) in accuracy, and it takes him two (2) seconds on average. In a handicapped competition, the competitors scores can be equalized with the 6-score competitor having one (1) point being deducted from the handicapped accuracy score and the 5-score competitor will have two (2) seconds added to the handicapped time score. These handicapped scores will be used to calculate the handicapped total score (T-score) and determine the overall winner. It is also possible to determine handicaps using the scores from a series of drills where certain parameters and other criteria must be met. For example, a handicap may be good for up to twelve (12) months contingent on the competitor having performed the drills at least three (3) times within a certain period of time. If a competitor continued to shoot the drills more than three (3) times throughout the year, the handicap can be determined based on a trailing number, such as the trailing three (3) scores, trailing five (5) scores, trailing ten (10) scores, or any other number of trailing scores. Preferably, the handicap is based on an average of ten (10) or less scores.

Figure 10A:
FIGS. 10A and 10B are screenshots of a skill developer dashboard and a forum dashboard, respectively, according to the present invention.
Figure 10B:
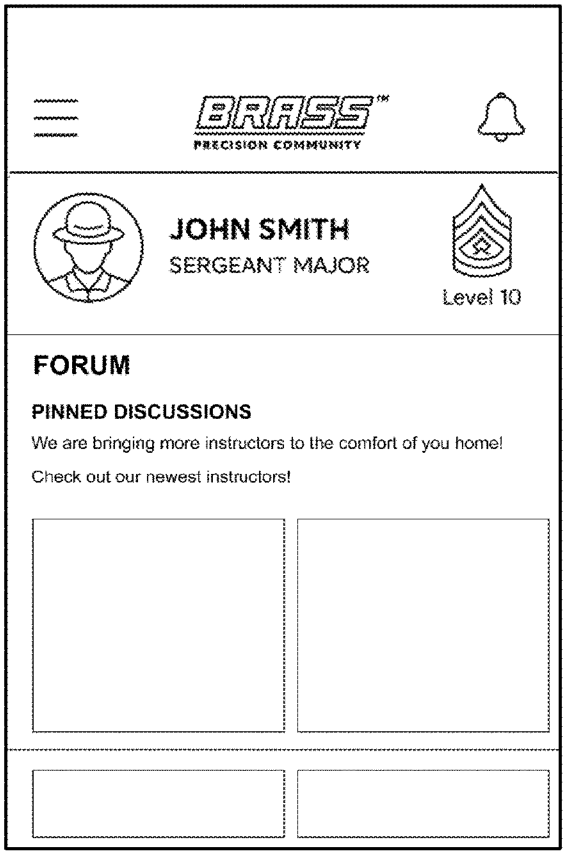

The skill developer tool is another component of the application that helps users build skills and gain certifications through video content and live instruction, forums, discussions, and other online applications and engagements. The dashboard for the skill developer tool is shown in FIG. 10A, and the forum dashboard is shown in FIG. 10B. The skill developer tool automatically curates content to their user profile based on their history of drills, preferences, challenges, and performance, and other user inputs to create skill developer plans for the users. This content helps the user to become better in the areas that the user is performing poorly compared to their goals or compared to other competitors in the user's community group(s) or in areas where their interest lays. The user is also able to take live skill building courses, have discussions with peers taking the same classes, interact with the professional instructors during the course, follow and complete curriculums that enable certifications that can be handed out by the instructors. Experts in their fields will be able to host live demonstrations and classes to users on the application and grow their customer base. It will be appreciated that the present invention could also provide users with the option to train under the direction of a virtual instructor that is based on machine learning algorithms and a natural language processor or some other form of artificial intelligence system.

The skill developer tool may also be used to generate content for users. For example, a marksman may want to modify a standard drill that is stored in the drill library for use with a particular target. As explained above, the skill developer tool provides users with recommendations for drills and corresponding targets. The user can select a recommended drill and a corresponding target and can then modify the scoring analytics for the drill, the smart shot clock parameters, and other peripheral devices that can be integrated into the drill to create their own formulated drill procedures and/or scoring. The user may also select a different standardized target that may be used with the selected drill either with the standardized scoring and smart shot clock parameters or with modifications. The user may have developed their own unique drill procedures for a target, but the drill is not one of the standardized drills in the drill library for the target or the target may not even be in the target library. In these cases, the user can either start with a standardized drill and modify it using the skill developer tool to make their formulated drill or they can start from scratch to create their formulated drill with the skill developer tool. Users can also upload their own videos which could include training lessons and may share this content with other users. The system can provide voting privileges to users who have reached a high enough skill proficiency level threshold that they can be considered trainers and/or experts for their respective platforms, and these trainers/experts can vote on the quality and content of the videos to help guide lower ranking users in identifying good quality training videos as curators of the video library 40.

Figure 6:
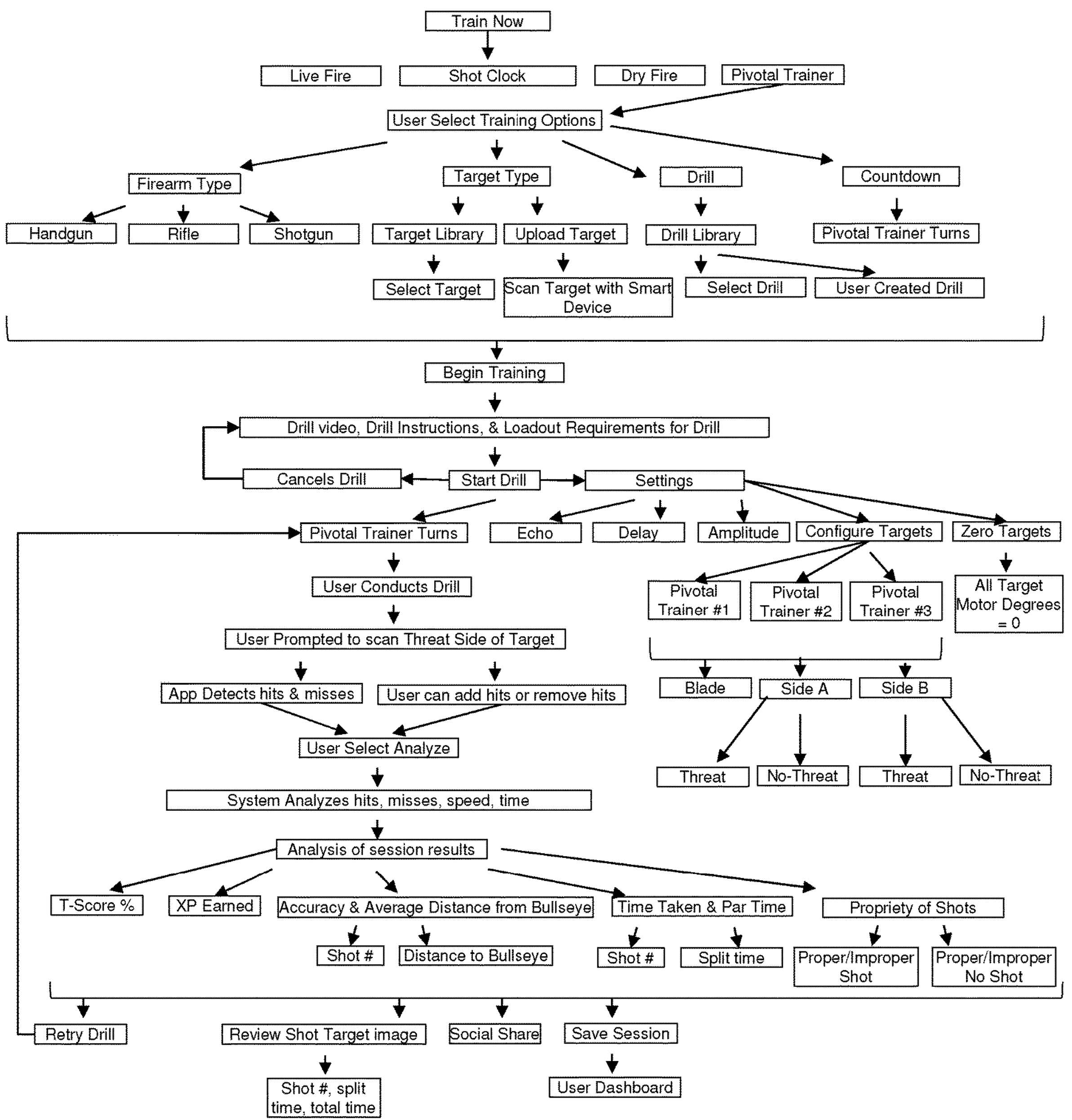
FIG. 6 is a flowchart of the dynamic target stand operations according to the present invention.

The mobile app includes a customization tool that users can operate to create their own metrics and drills. When the mobile app is used in combination with a wirelessly controlled dynamic target stand, such as the Pivotal Trainer target system, users can set up a complete custom course of fire with instructions for turning one or more targets at various times during the drill. A flowchart of the mobile app integration with a dynamic target stand is shown in FIG. 6, and the steps and functionality are described in detail below. The instructions would be built on the application and saved as a drill/program that is wirelessly communicated to the target stand's computer controller as the drill progresses so the motorized turning unit turns the target at either set times during the drill or at random times during the drill. Users of the mobile app could build a course with a single target stand system or multiple target stand systems which may have different criteria. Once users have completed the custom course, the users would upload the drill for private use, friend-only use, or public use. Before a drill is accepted for public use, it would preferably be subject to an audit by a server administrator 56 or an administrative team to ensure the drill is viable and results in positive learning. Users of the mobile app could also build and submit a drill within the app that doesn't require a target stand system or any other external device. In this situation, the user would select the "Custom Drill" option. The user would then be asked to fill out a series of questions, such as the number of targets, the size of targets, the total time of the drill, load out, and specify the conditions of the drill. As an example, two (2) shots fire at target one, five (5) shots at target two. When the user has answered the "drill requirements" questions, the system creates the instructions according to the answers, and the user uploads the drill instructions for private use, friend-only use, or public use. As explained above, the public use option would preferably require the audit before it is approved for publication to the community.

It will be appreciated that the web-based server collects analytical and other data for shooting activities of all types including target shooting, sports shooting, recreational shooting, skill development, firearm training, other activities, including usage habits. As described above, the system allows for real time scoring with feedback to the user that can measure aspects of time, i.e., total time, split time(s), and reaction time(s) and shot placement, i.e., accuracy and precision, and shot choice and decision making, i.e., shoot when presented with a threat side of a target or no shoot when presented with a nonthreat side of the target. The system can accommodate marksmen of all skill levels and types of usage and provides different applications for different types of usage (recreational users vs. professional users) using live fire ammunition and/or dry fire lasers.

A nonlimiting list of recreational users includes firearm enthusiasts and hobbyists, 'plinkers,' sportspersons, hunters, and amateur competitive shooters. Based on each individual user's settings and preferences, this platform allows users to challenge, communicate, and engage with other users of the application. Users can share content, create filters, compare scores with their historical records that are stored in the system or with other users. Users can also participate in skill building exercises, facilitate competitions, conduct and participate in educational forums, access coaching, and interact with each other through engagements hosted on the server and presented in the application running on the users' mobile computing devices. The foundation of this technology platform and its distributed online network is the interactivity of the server with each one of the users through their mobile computing devices with networked communications and between the users using the central server as a hub for the networked communications which creates a new way for users to interact with each other in a virtual range environment, record and share data in a variety of ways which enhances the experiences of all recreational users regardless of their skill levels.

A nonlimited list of professional users includes law enforcement, military, government agencies, and private security professionals and providers. As with recreational users, the technology provides a platform that provides benefits for professionals throughout their careers, from the initial training courses through continued education for all levels of skill and experience. The technological foundation and distributed online network for the platform that supports recreational users is also used for the professional users, i.e., the interactivity of the server with each one of the users through their mobile computing devices and networked communications with the server and each other. As generally described above and explained in more detail below, the platform allows the users to adopt or create training standards and from which to objectively train with live fire ammunition, marking cartridges, and dry fire lasers. The scoring process is automated and consistent throughout the user base. The technology allows a profile or dashboard to be created for each user which can be assessed by people with appropriate permissions and credentials to review performance trends determine if the user meets specified criteria for various tasks or not.

It will be appreciated that the same technological foundation and distributed online network for the platform supports the learning modules that enhance the training of soft skillsets that can include implicit bias mitigation, challenging stereo types, de-escalation techniques, decision making (less-than-lethal vs. lethal responses, shoot/threat vs. no shoot/nonthreat), stress inoculation training which can include the heartrate monitor as described above, and more. The learning modules can be live and fully interactive or pre-recorded and forums, discussions, and seminars and, when applicable, can culminate in live fire, marking cartridge training, or dry fire laser training drills to reinforce the objectives of the learning module. In traditional shooting ranges, a marksman can schedule training lessons only with those subject matter experts (SMEs) that are within a short traveling distance to the facility's location or may be connected through separate video conferencing systems which are limited in number and would have to be rented out when available. With the virtual shooting range, a marksman can search for SMEs that fit with their particular desires and goals and schedule training at the mutual convenience between the marksman and a chosen SME.

The automatic, machine-based scoring provides objective and consistent scoring is beneficial for competitions and is particularly useful for professional training. For professional training, it is important to establish standards and objective criteria with consistent scoring. For example, a training standard could include a time element as part of the standard in addition to scores for accuracy and precision, such as when a target presents for a preset amount of time and reaction time is also scored because the user has three (3) seconds to deliver three (3) shots when the threat side of a target is presented. Without an automated start for the smart shot clock, if a person is starting a shot clock, some trainers may start the clock as soon as the target begins moving and in this group, one trainer may have a slower response time than other trainers which could skew the results higher for the trainees who have the slower trainer, and another group of trainers may not start the shot clock until the target is fully turned to the trainee which would also skew the results higher for the trainees of this other groups of trainers. As another example for a time allotment in which the trainees should shoot five (5) rounds in ten (10) seconds, the trainer yells “Cease Fire” at the conclusion of the time period (or blowing a whistle based on a stopwatch) but this is also subjective because some trainers may yell immediately while others may be slightly delayed in yelling time, and there could still be more shots that are fired late. If there is a single trainee, the drill can be scrapped and repeated, but if there are multiple trainees as is usually the situation, it could be very difficult for the trainer to identify the trainee(s) who fired late. Even if there is video of the drill, there are then delays in the trainer having to review the video to determine which trainee(s) fired late.

Objective and consistent scoring that is automatically performed using machine vision and using sound analytics also eliminates subjectivity with regard to the accuracy and precision scoring. The machine vision will consistently apply an objective, predefined standard to determine whether a shot is inside the 10-point circle or not. When trainers have been asked how they would score a bullet hole touching the 10 ring, there are several subjective standards that they apply: (a) It must be all the way inside without touching the ring; (b) If it's in the 10 zone and touching the line, it counts; (c) It can be on the ring line and counts as 10 if more of it is in the 10 zone than 9; (d) As long as it's touching a line, it counts for the higher of the two (2) zones; (e) If I have to look at it for more than three (3) seconds it goes to the lesser of the two (2) zones in question. In the situation where there are multiple trainees and the qualification calls for five (5) shots in ten (10) seconds, the inventive system eliminates the subjective issues with time, such as defining when the smart shot clock starts for the drill and sending a signal to a whistle or horn to automatically blow at the end of a drill so the trainer can be on the watch for trainees firing late. Additionally, with the integration of the dynamic target stands to the smart shot clock, the timer automatically begins when the dynamic target stands turn the targets to present the threat side to the trainees and when the designated time is complete, the dynamic target stands turn the targets back to the blade orientation to reduce the possibility that a late shot will register on the target.

An example process for a marksman following the steps to use the system of the present invention is presented below.

- Marksman downloads the software app to marksman's mobile computing device
- Marksman creates a user profile on the server with an interface from the software app (or skip)
- Marksman/User sets up a target and scans it with mobile computing device's camera using software app (can save target)
- User confirms target match using machine vision mode of operation with cloud-based target library on the server or may use text query for target (or skip)
- User selects from a drop-down menu of skill building exercises corresponding with matched target (or skip and go to ‘free range’)
- When ready, user selects the ‘start’ button and follows the skill building exercise or shoots ‘free range’
- Time begins when automatically prompted and time ends when the last shot registers with the mobile computing device
- User scans target with mobile computing device's camera using software app and uses machine vision to automatically identify shots on target (may manually correct errors)
- Software app determines & presents scores on time and shot placement and an overall score (“T-Score”) combining the time and shot placement scores
- The target, drill, shots, and scores can be saved for personal reference only, shared for all users to view, or any combination thereof With the present invention, trainees could actually be in different locations so their mobile computing device could detect a late shot in the drill. For trainees that are at the same location, the microphones for the mobile computing device for each user could be calibrated so it can identify the user's specific round being discharged even when other shooters are nearby. When a specific firearm/ammo type/environment is uploaded into the server's database, its audible signature can be saved for future sessions based on the shooting environment. This would eliminate the current issue of picking up other people's rounds being fired causing false positives and inaccurate time related results when time splits are important. This improvement could result from the output of the actual decibel and sound of the firearm being discharged or a small accelerometer that could be affixed to each firearm and wirelessly connects to the software app running on each user's corresponding mobile computing device or a smart ‘sticker’ that detects shock or otherwise recognizes vibrations. With the addition of machine learning into the system, when a user inputs their ammo type, the system will already understand presets for audio signatures so no sound calibration would be required. It will also be recognized that since each mobile computing device can be integrated with a corresponding dynamic target stand, when all of the trainees are together in the same location, the start time for each trainee could be staggered slightly and although the trainer would know the order of the targets to be turned, the trainees would not know whether theirs is the first target to turn, the last target to turn or any time between the first target and the last target. Since the trainer knows the order of the targets turning, the trainer can be on the watch for any trainee that shoots late when the target moves to the blade orientation.

As an example of a staggered start to a drill for multiple trainees is provided, a one (1) second staggered start can be used in a drill with ten (10) trainees in which each trainee gets five (5) seconds to perform the drill. In this scenario, trainee1 starts at time_0 sec when trainee1's target turns and trainee1's shot clock begins. At time_1 sec, trainee2's target turns and the trainee2's shot clock begins. At time_2 sec, trainee3's target turns and the trainee3's shot clock begins. This continues to trainee 10's target turns at time_10 sec. Since this is five (5) second drill, the trainer is looking at trainee1 at time_5 sec to see trainee1's target turn to the blade orientation and to confirm that trainee1 does not shoot late. At time_6 sec, the trainer is looking at trainee2 to see trainee2's target turn to the blade orientation and to confirm that trainee2 does not shoot late. This continues until time_15 sec when the trainer is looking at trainee_10 to confirm that there is no late shot.

The dynamic target stand is preferably the applicant's PIVOTAL TRAINER target system as described in U.S. Pat. No. 10,295,315 which is incorporated by reference herein. The PIVOTAL TRAINER target system has a motorized turning unit that is operated by signals from a computer controller. The computer controller has a wireless communications module that is in communication with the mobile app and has preprogrammed orientations for the target when it is held by the target holder, such as target side A, target side B, and blade orientation. With these preprogrammed orientations and the communication with the mobile app, the user or a trainer can define the sides of a double-sided target in the mobile app as either being the threat side (e.g., side A) or the nonthreat side (e.g., side B), so when the target system moves the target between the blade orientation, the threat side, and the nonthreat side, the mobile app determines whether the orientation corresponds to the threat side, the nonthreat side, or the blade orientation. The blade orientation and the nonthreat side of the target are defined in the system as a no shot orientation and the threat side of the target is defined in the system as a shot authorized orientation. The preferred target system is portable so it can easily be transported and set up at different locations. The preferred target system is also collapsible or readily disassembled and reassembled to minimize the space needed for its storage and allows users to set it up and break it down in minutes. Additionally, the preferred target system does not require a concrete pad, pneumatics, cables, or overhead tracks.

With the no shot orientation and the shot authorized orientation defined, the system of the present invention can determine whether each shot is a proper shot or and improper shot and whether time periods without any shot is a proper no shot or an improper no shot. In particular, the wireless communication module of the mobile computing device received a series of signals from the dynamic target stand's computer controller, and each one of the signals corresponds with a rotation of the target between the optional orientations which can include a no shot orientation and a shot authorized orientation. This rotation may be from a no shot orientation to a shot authorized orientation or from a shot authorized orientation to a no shot orientation. The rotation could also be from a no shot orientation to a no shot orientation or from a shot authorized orientation to a shot authorized orientation. As described in detail above, depending on whether the drill is dry fire with laser shots or live fire with ballistic shots, the camera or the microphone the series of the shots fired at the target and the time periods with no shots fired between the series of shots, and the processor determines corresponding sets of times for the initialization time for the signals and for the shots according to the shot clock. Since the processor also has the no shot orientation and the shot authorized orientation for each one of the time periods, the processor also determines propriety for each of the shots fired at the target and for the time periods with no shots. Each one of the shots fired at the target during the shot authorized orientation is determined to be a proper shot, and each one of the time periods with no shots during the no shot orientation is determined to be a proper no shot. In comparison, each one of the shots fired at the target during the no shot orientation of the target is determined to be an improper shot, and each one of the time periods with no shots during the shot authorized orientation is determined to be an improper no shot. The processor can determine a deduction to the score for each improper shot and for each improper no shot. It will be appreciated that the processor of the mobile computing device can interpret the series of signals as a starting parameter for the shot clock and a set of split time parameters for the shot clock. The initial signal in the series of signals can correspond to the starting parameter, and subsequent signals following the initial signal can correspond with split time parameters for the shot clock.

The system can provide specialized training for professional users that not only provides drills for the mechanics of training but can also include mindset content and making decisions training (M3—Mechanics, Mindset & Making Decisions). which results in a holistic approach to firearm training for professionals with a comprehensive set of features and functions that provides training solutions for both the mechanics of shooting (crucial to making decisions and mechanics) and the soft sciences related to shooting (crucial to mindset and making decisions). The technological foundation for the platform is a key component to both making decisions and mechanics because it automates the scoring process which eliminates human error and/or bias. Additionally, as explained above, reaction time can be built into drills and corresponding standards. Additionally, the software for the app of the present invention can be incorporated into the remote controllers for wirelessly controlled dynamic target stands with computer controllers, such as the remote controller for the Elite PIVOTAL TRAINER target system as well as remote controllers for other dynamic target stands, and can measure reaction time which can also be a built into the standards. Also, when operating with the turning target system, inconsistent target exposure time for professionals to qualify is eliminated because the predetermined exposure times can be programmed into the course of fire. The online training, presentations, forums (that can be interactive and live or prerecorded and accessed from the library) are examples of the mindset features of the present invention. The online educational materials can include areas of particular interest to the professional users, including post-traumatic stress disorder (PTSD), brain nutrition, the importance of sleep, unintended consequence of substance abuse, stress outlets, the psychology of violence, how to understand and mitigate implicit biases, and de-escalation strategy and tactics.

Figure 12:
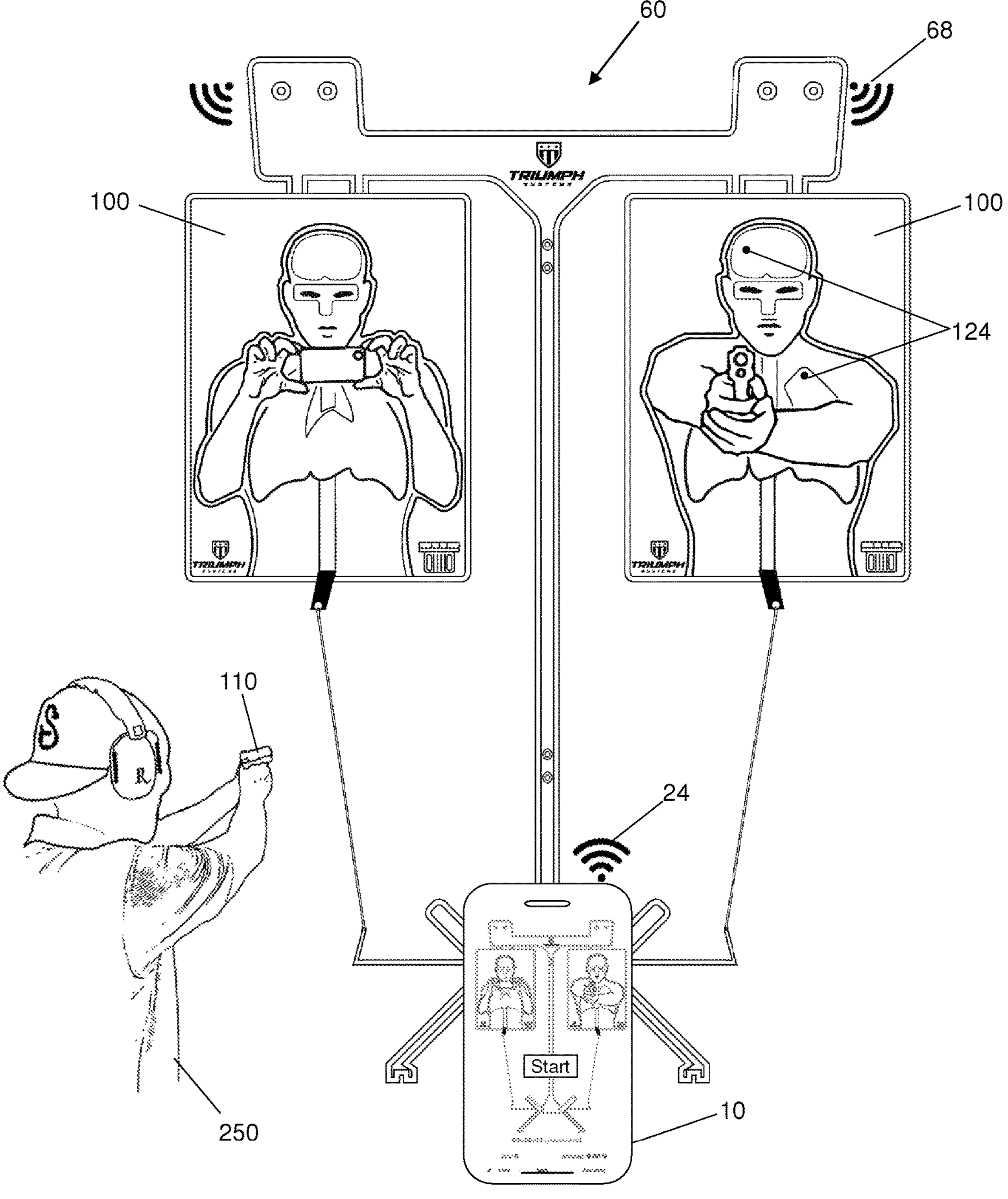
FIG. 12 is an image of the present invention in operation with multiple dynamic target stands.

It will also be appreciated that the features of the present invention can be used with one multiple-sided target on a single dynamic target stand or with targets on multiple dynamic target stands, such as shown in FIG. 12. When the user selects the option to configure or replace targets, the app provides an interface that controls the motors of the dynamic target stands. The user enters into the system the side of the target being displayed as either the threat side of the target or the non-threat side of the target. The targets are readied for the drill by putting them into the blade orientation, and the target motors are wound to the same position so they can turn in sequence without interruption. When using multiple motors to turn the targets, each motor should start from the same degree to ensure that the motors finish the drill sequence in unison with each other. With the wireless communication between the mobile computing devices and the computer controller for the dynamic target stands, the software automatically starts the drill, restarts the shot clock for split times, and stops the drill based on the signals from the dynamic target stand that correspond with the initial turning of the target, the additional turns of the target, and the last turn of the target for the end of the drill. With this integration, there is no need for audio initiation to start a drill or a standard timer to start the drill. It can all controlled by the motor turning initiation. Of course, an instructor could also call out shot instructions, such as "red 1" or "blue 2", through a headset that the marksman is wearing.

For professional users, the process of measuring and scoring the aspects of time, i.e., total time, split time(s), and reaction time(s), and shot placement, i.e., accuracy and precision is very similar to the process used for recreational users. However, different drills can be used and the criteria for scoring can also be different since its purpose is the evaluation of the professional user's proficiencies. The resulting scores for professional users can be evaluated relative to an established standard to determine if each individual professional is prepared for a specific task or responsibility or should be provided with remedial training.

In skills related to platform choice, shot choice, making decisions, the integration of the software app with wirelessly controlled dynamic target stands is particularly helpful because the integration forces the user to make a use of force decision. The dynamic target stand can have a double-sided target with one side being a threat side (side A) and the opposite side being a nonthreat side (side B). The software can detect, measure, score, and record important data, such as whether or not the trainee took a shot at the target when the non-threat side of the target had been presented and the trainee's reaction time in shooting at either side of the target. This type of training and the analytics behind it is critical to understanding and improving the trainee's OODA loop (i.e., Observe, Orient, Decide, Act) as well as reaction time.

Figure 7:
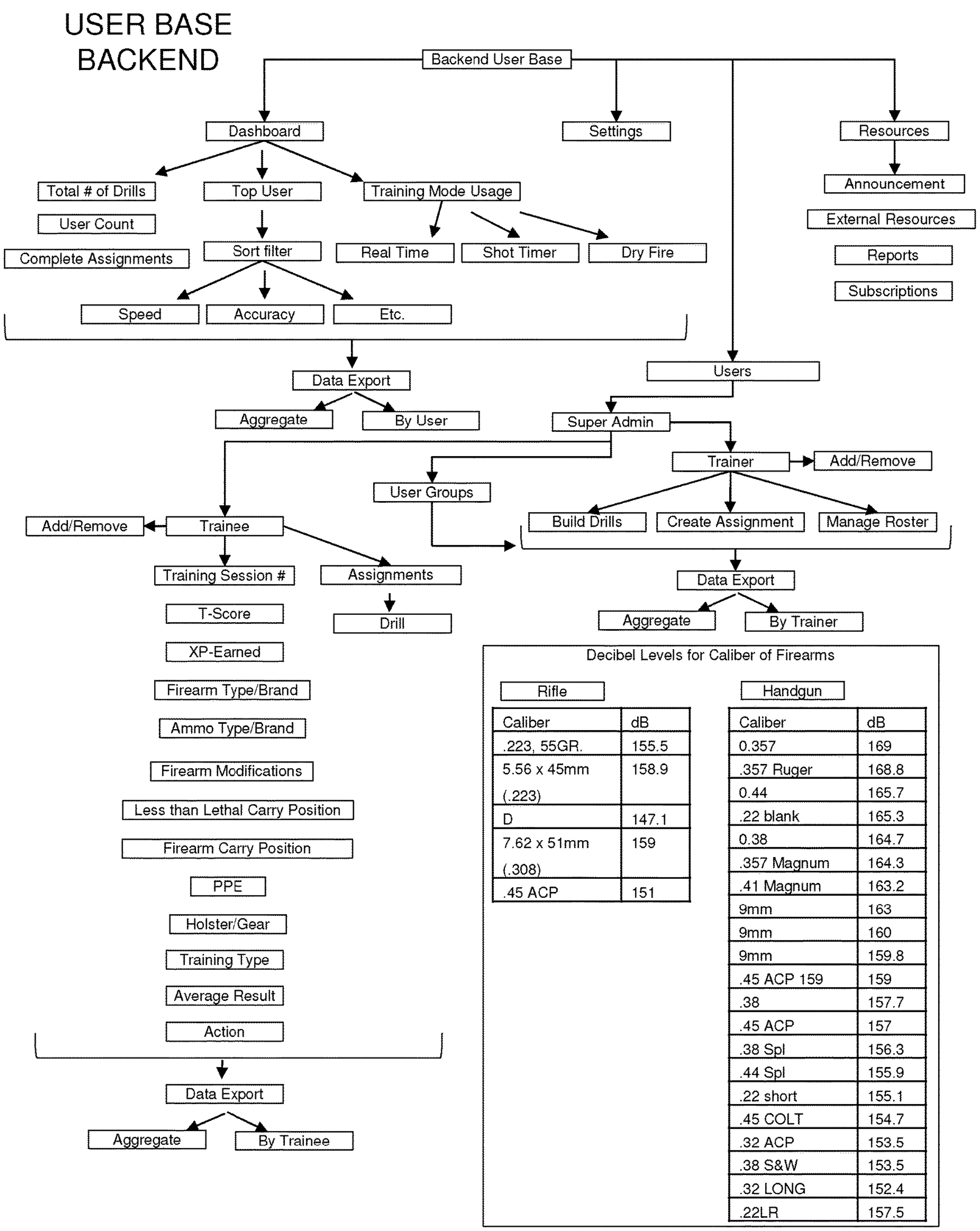
FIG. 7 is a flowchart of the user base backend operations according to the present invention.

The user base backend operations are shown in FIG. 7. The present invention stores user profiles 36 on the central server and can also allow administrative users to create user groups 38, and marksmen users, instructor users, and trainer/expert users can be associated with various user groups as members. Some groups may have a closed membership that requires the approval of the group's administrative user to join the closed user group 38*a*. For example, military units, law enforcement agencies, private security teams, private shooting clubs, and competitive leagues would close their membership to only those users who are a part of their groups. In comparison, public shooting clubs and open leagues would allow anyone to join their open communities 38*b*. The groups allow the members of the various groups to more easily connect with each other through the app and also allow the administrative users of the groups to coordinate, manage, and track the training history, training performance and goals, and training needs and requirements of the members. The administrative users have permission to add and delete users from their membership roles in the app. The administrative users can also identify members of their groups that are trainers and/or certified instructors according to the rules of their respective groups.

The central server saves scores for the marksmen as performance indicators. The system tracks multiple performance indicators for the members of the various user groups. Preferably, the system also identifies sets of user groups which have similarities, such as in the number of members, the ranking of members, the demographics of municipalities associated with the user groups, or the responsibilities and/or mission of the military units or law enforcement agencies. With this information saved in the server's database, the system can compare the performance indicators for user groups based on their similarities. It will also be appreciated that the system could also compare the performance indicators for user groups that have defined differences. The data can be exported or otherwise made available to the administrative users of the groups, some for free and some for purchase, and the data from other groups can be anonymized.

The present invention can also provide rapid situational-based training scenarios. For example, within days of an officer involved shooting (OIS), a learning module can be created and made available to all users that debriefs the shooting beginning with an overview, stitched together video (body, dash, security, media, and iPhone), a guided discussion, and a live fire (or marking cartridge) reenactment of the OIS event. Through the learning modules, all aspects of good traits for policing can be covered. The basic outline of learning modules that review OIS is 1) review the case by reading the after action; 2) watch a video that is stitched together form dash, body, security, media, and iPhone; 3) participate in a guided discussion (or watch a debriefing); 4) conduct a drill with firearms that recreates the event using static targets and/or the turning targets.

It will appreciated that the virtual shooting range as described above is a particular benefit of the present invention which has not been available in prior art systems. The virtual range allows end users, regardless of application, purpose, or skill level, to interact with each other and themselves as they develop skills over time in ways that have not been available in the past. Because important metrics that deal with speed and time, shot placement, stress inoculation, and decision making can be measured and recorded with the present inventive system, not only is the feedback loop automated and instantaneous, but these results can be recorded and evaluated over time to determine trends and progress toward personal goals and standardized proficiency levels. Interactions between oneself and others are largely controlled by profile settings and can include individual training, competitions, drills, and skill building exercises.

For recreational and other amateur users, the virtual range has social interactions as well as the features to evaluate skills, track status and progress toward goals, share results, compete, and provide lessons and guidance. The skill building exercises can be live or recorded forums where results can be analyzed by oneself or another person for feedback. For professional users, in addition to the features, functionality, and social interactions available to the recreational users, the virtual range provides a readiness application with defined standards for proficiency levels and training programs and objective evaluation criteria. As described above, areas include aspects of time and speed (overall, splits, reaction); shot placement (accuracy and precision); and decision making (was the right decision made for threat vs no threat). As also described above, biofeedback criteria can be incorporated into the training standards.

The embodiments have been chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. It will be appreciated the features and functionality of the present invention can be incorporated into known shooting drill software apps and dynamic target systems as technical improvements. As one example, the laser burst control functionality could be incorporated into the '818 Patent. As another example, the total distance measurement system using both the front camera and the back camera could be incorporated into U.S. Pat. No. 10,648,781 which is incorporated by reference herein. It will further be appreciated that the modifications to the adapter and software of the mobile computer described in the '781 Patent would change the principle of operation of the disclosed system to conform to the present invention, but these modifications would be evident to a person of ordinary skill in the art. Thus, the breadth and scope of the present invention should not be limited by any of the above-described exemplary embodiments, but should be defined only in accordance with the following claims appended hereto and their equivalents.

What is claimed is:

1. A method for automatically evaluating a marksman in a shooting drill with a series of shots fired at a target held by a dynamic target stand comprising a motor, a computer controller, and a target holder, wherein the motor rotates the target holder and the target between a series of no shot orientations and a series of shot authorized orientations, wherein each of the orientations is maintained for a period of time, the method comprising the steps of:

providing a mobile computing device comprising a camera, a microphone, a memory, a processor, a touchscreen, and a wireless communication module, wherein the wireless communication module is in operative communication with the computer controller of the dynamic target holder;

receiving in the wireless communication module of the mobile computing device a series of signals from the computer controller of the dynamic target stand, wherein each one of the signals corresponds with a rotation of the target between a group of orientations comprising a no shot orientation and a shot authorized orientation;

detecting with at least one of the camera and the microphone the series of the shots fired at the target and time periods with no shots fired between the series of shots, wherein the camera detects a laser burst impact on the target as each of the shots fired at the target, and wherein the microphone detects a gunpowder blast as each of the shots fired at the target;

determining with the processor a first set of times and a second set of times according to a shot clock in the processor, wherein the first set of times correspond to an initialization time automatically starting the shot clock for each one of the signals in the series of signals received from the computer controller of the dynamic target stand, and wherein the second set of times correspond to the detection of the shots in the series of shots fired at the target respectively following the first set of times; and determining with the processor a propriety for each of the shots fired at the target and for the time periods with no shots, wherein each one of the shots fired at the target during the shot authorized orientation is determined to be a proper shot, wherein each one of the time periods with no shots during the no shot orientation is determined to be a proper no shot, wherein each one of the shots fired at the target during the no shot orientation of the target is determined to be an improper shot, and wherein each one of the time periods with no shots during the shot authorized orientation is determined to be an improper no shot.

2. The method of claim 1, further comprising the step of interpreting in the processor of the mobile computing device the series of signals as a starting parameter for the shot clock and a set of split time parameters for the shot clock, wherein an initial signal in the series of signals corresponds with the starting parameter, and wherein subsequent signals following the initial signal correspond with split time parameters for the shot clock.

3. The method of claim 1, further comprising the steps of:

storing on a central server a target database comprising a set of target images and a corresponding set of target specifications, wherein the target specifications comprise a set of geofenced features in the respective target images and a corresponding set of score values for the geofenced features;

capturing a set of images of the target with the camera, wherein the set of images is comprised of a first image of the target without any strike and a second image of the target with at least one strike;

determining in the processor the target specifications using the first image of the target;

determining in the processor a location of each strike on the target for the corresponding shots according to a comparison of the second image with the first image;

assigning in the processor a score for the shots according to the location of each strike on the target relative to the set of geofenced features and the corresponding set of score values; and determining in the processor a deduction to the score for each improper shot and for each improper no shot.

4. The method of claim 3, further comprising the steps of:

displaying the second image on the touchscreen with a set of visual indicators for each strike on the target;

manually adding another visual indicator to the second image on the touchscreen for an additional strike on the target, wherein the processor did not determine the strike in the comparison of the first image and the second image;

sending a set of training instructions from the mobile computing device to the computer controller, wherein the set of training instructions comprise turning orientations and time periods for the corresponding turning orientations;

determining in the processor a precision value for the set of shots relative to each other and the predefined point;

determining in the processor a set of split times between the set of shots and a total time for the set of shots;

calculating in the processor the score based on the deduction and the set of accuracy values in combination with at least one of the precision value, the set of split times, and the total time; and saving the score of the marksman for the shooting drill in the memory.

5. The method of claim 1, further comprising the steps of:

storing in the memory an initial laser burst as a command for the processor to initiate the shooting drill when the detection of the initial laser burst occurs while the shooting drill is in a ready stage;

detecting with the camera an initial laser burst on the target, wherein the target is spaced a distance away from the mobile computing device;

determining with the processor the ready stage of the shooting drill; and automatically initiating the shooting drill when the initial laser burst is detected while the processor detects the shooting drill is in the ready stage.

6. A method for automatically evaluating a marksman in a shooting drill with a series of shots fired at a target held by a dynamic target stand comprising a motor, a computer controller, and a target holder, wherein the motor rotates the target holder and the target between a blade orientation and at least one of a front side orientation and a back side orientation, wherein each of the orientations is maintained for a period of time, the method comprising the steps of:

providing a mobile computing device comprising a camera, a microphone, a memory, a processor, a touchscreen, and a wireless communication module, wherein the wireless communication module is in operative communication with the computer controller of the dynamic target holder;

receiving in the wireless communication module of the mobile computing device an initial turn signal from the computer controller of the dynamic target stand, wherein the initial turn signal corresponds with a rotation of the target to the front side orientation from at least one of the back side orientation and the blade orientation;

producing in the processor an initialization signal in response to receiving the initial turn signal; and automatically starting a shot clock in the processor according to the initialization signal.

7. The method of claim 6, further comprising the step of detecting with at least one of the camera and the microphone a first shot in the series of the shots fired at the target, wherein the camera detects a laser burst impact on the target for the first shot, and wherein the microphone detects a gunpowder blast for the first shot.

8. The method of claim 7, further comprising the steps of:

recording in the memory a first shot time according to the shot clock, wherein the first shot time corresponds with the detection of the first shot; and determining in the processor a first reaction time between the starting of the shot clock and the first shot time.

9. The method of claim 8, further comprising the steps of:

receiving in the wireless communication module of the mobile computing device a series of turn signals from the computer controller of the dynamic target stand following the initial turn signal, wherein each one of the turn signals corresponds with another rotation of the target to one of the orientations;

recording in the memory a set of turn times for each of the turn signals according to the shot clock;

detecting with at least one of the camera and the microphone the series of the shots fired at the target following the series of turn signals following the initial turn signal;

recording in the memory a set of shot times according to the shot clock, wherein the set of shot times corresponds with the series of shots; and determining in the processor a set of reaction times between the set of turn times and the set of shot times.

10. The method of claim 9, further comprising the steps of:

defining in the processor each of the blade orientation and the back side orientation as a no shot orientation;

defining in the processor the front side orientation as a shot authorized orientation; and determining with the processor a propriety for each of the shots fired at the target and for time periods with no shots, wherein each one of the shots fired at the target during the shot authorized orientation is determined to be a proper shot, wherein each one of the time periods with no shots during the no shot orientation is determined to be a proper no shot, wherein each one of the shots fired at the target during the no shot orientation of the target is determined to be an improper shot, and wherein each one of the time periods with no shots during the shot authorized orientation is determined to be an improper no shot.

11. The method of claim 10, further comprising the steps:

capturing a set of images of the target with the camera, wherein the set of images is comprised of a first image of the target without any strike and a second image of the target with a set of strikes corresponding with the series of shots;

determining in the processor a location of each strike on the target for the series of shots according to a comparison of the second image with the first image;

determining in the processor a set of accuracy values corresponding with the set of shots relative to a predefined point on the target;

calculating in the processor a score based on the set of accuracy values;

determining in the processor a decision making metric according to the propriety of the shots in the series of shots; and saving the decision making metric and the score of the marksman for the shooting drill in the memory.

12. The method of claim 11, further comprising the step of determining in the processor a content recommendation for the marksman according to at least one of the decision making metric, the score, a user input, and a set of user preferences, wherein the content recommendation is comprised of at least one of a new shooting drill and a skill developer plan, wherein the set of user preferences are stored in the memory, and wherein the user input is entered into the mobile computing device.

13. The method of claim 11, further comprising the steps of:

displaying the second image on the touchscreen with a set of visual indicators for the set of strikes; and manually adding another visual indicator to the second image on the touchscreen for a strike on the target, wherein the processor did not determine the strike in the set of strikes in comparing the first image and the second image.

14. The method of claim 6, further comprising the steps of:

providing a heartrate monitor in operative engagement with the marksman;

producing in the heartrate monitor a set of heartrate measurements for the marksman during the shooting drill; and receiving in the wireless communication module of the mobile computing device the heartrate measurements.

15. The method of claim 6, further comprising the steps of storing on a central server a set of training instructions, wherein the set of training instructions comprise turning orientations and time periods for the corresponding turning orientations;

downloading from the central server the training instructions to the memory of the mobile computing device; and sending the set of training instructions from the mobile computing device to the computer controller.

16. A method for automatically evaluating a marksman in a shooting drill with a series of shots fired at a target held by a dynamic target stand comprising a motor, a computer controller, and a target holder, wherein the motor rotates the target holder and the target between a blade orientation and at least one of a front side orientation and a back side orientation, wherein each of the orientations is maintained for a period of time, the method comprising the steps of:

providing a mobile computing device comprising a camera, a microphone, a memory, a processor, a touchscreen, and a wireless communication module, wherein the wireless communication module is in operative communication with the computer controller of the dynamic target holder;

sending a first set of training instructions from the mobile computing device to the computer controller, wherein the first set of training instructions comprise a first set of turning orientations and a first set of time periods for the corresponding turning orientations;

receiving in the wireless communication module of the mobile computing device a series of signals from the computer controller of the dynamic target stand, wherein each one of the signals corresponds with a rotation of the target between a front side orientation and a back side orientation according to the turning orientations;

detecting with at least one of the camera and the microphone the series of the shots fired at the target and time periods with no shots fired between the series of shots, wherein the camera detects a laser burst impact on the target as each of the shots fired at the target, and wherein the microphone detects a gunpowder blast as each of the shots fired at the target; and determining with the processor a first set of times and a second set of times according to a shot clock in the processor, wherein the first set of times correspond to each one of the signals in the series of signals corresponding with the rotation of the target and automatically starting the shot clock, and wherein the second set of times correspond to the detection of the shots in the series of shots fired at the target respectively following the first set of times.

17. The method of claim 16, further comprising the steps of:

storing on a central server multiple sets of training instructions, wherein each set of training instructions comprises turning orientations and time periods for the corresponding turning orientations, wherein each one of the turning orientations is selected from the group of orientations consisting of the front side orientation, the back side orientation, and a blade orientation;

downloading from the central server a second set of training instructions to the memory of the mobile computing device; and sending the second set of training instructions from the mobile computing device to the computer controller, wherein the second set of training instructions replaces the first set of training instructions and comprises a second set of turning orientations and a second set of time periods for the corresponding turning orientations.

18. The method of claim 16, further comprising the steps of:

capturing a set of images of the target with the camera, wherein the set of images is comprised of a first image of the target without any strike and a second image of the target with a set of strikes corresponding with the series of shots;

determining in the processor a location of each strike on the target for the corresponding shots according to a comparison of the second image with the first image;

determining in the processor a set of accuracy values corresponding with the set of shots relative to a predefined point on the target;

determining in the processor a total time for the set of shots and a set of split times for the set of shots from the corresponding first set of time periods;

calculating in the processor a score based on the set of accuracy values in combination with at least one of the precision value, the set of split times, and the total time; and saving the score of the marksman for the shooting drill in the memory.

19. The method of claim 18, further comprising the steps of:

displaying the second image on the touchscreen with a set of visual indicators for the set of strikes; and manually adding another visual indicator to the second image on the touchscreen for a strike on the target, wherein the processor did not determine the strike in the set of strikes in the comparison of the first image and the second image;

storing in the memory a set of user preferences for the marksman; and producing with the processor a set of skill developer plans based on the score of the marksman for the shooting drill and the user preferences for the marksman, wherein the set of skill developer plans is a group of plans consisting of a set of training videos, a set of live instructions, a set of forums, a set of discussions, a set of online applications, a set of shooting drills, and any combination thereof.

20. The method of claim 16, further comprising the steps of:

detecting with the camera a first instance of the laser burst on the target, wherein the target is spaced a distance away from the mobile computing device;

retrieving from the memory a first command associated with the detection of the first instance of the laser burst on the target; and implementing in the processor the first command, wherein the first command is at least one of initiating the shooting drill from a ready stage and saving into the memory a result from the shooting drill from an end of the shooting drill.

* * * * *